United States Patent
Yamaguchi

(10) Patent No.: US 7,916,327 B2
(45) Date of Patent: Mar. 29, 2011

(54) APPARATUS, METHOD, AND PROGRAM FOR AUTOMATICALLY GENERATING A SET OF POSSIBLE PRINT JOB WORKFLOWS AND SELECTING A MOST SECURE PRINT JOB WORKFLOW FROM THE SET OF POSSIBLE PRINT JOB WORKFLOWS

(75) Inventor: Naohiro Yamaguchi, Kawasaki (JP)

(73) Assignee: Canon Kabushiki Kaisha, Toyko (JP)

( * ) Notice: Subject to any disclaimer, the term of this patent is extended or adjusted under 35 U.S.C. 154(b) by 1155 days.

(21) Appl. No.: 11/564,749

(22) Filed: Nov. 29, 2006

(65) Prior Publication Data
US 2007/0136087 A1   Jun. 14, 2007

(30) Foreign Application Priority Data
Dec. 13, 2005   (JP) .................. 2005-359075

(51) Int. Cl.
*G06F 3/12* (2006.01)
*G06F 17/00* (2006.01)
*G06F 7/04* (2006.01)
*G06K 15/00* (2006.01)
*G06F 17/30* (2006.01)
*H04N 7/16* (2006.01)

(52) U.S. Cl. ............ 358/1.15; 358/1.13; 358/1.14; 726/1; 726/26; 726/27

(58) Field of Classification Search .......... 358/1.13, 358/1.14, 1.15; 726/1, 26, 27
See application file for complete search history.

(56) References Cited

U.S. PATENT DOCUMENTS

| | | | | |
|---|---|---|---|---|
| 7,224,913 | B2* | 5/2007 | Richards | 399/16 |
| 7,230,736 | B2* | 6/2007 | Fromherz | 358/1.16 |
| 7,233,405 | B2* | 6/2007 | Fromherz | 358/1.13 |
| 2001/0043357 | A1* | 11/2001 | Owa et al. | 358/1.15 |
| 2002/0138322 | A1* | 9/2002 | Umezawa et al. | 705/8 |
| 2004/0015687 | A1* | 1/2004 | Chiarabini et al. | 713/153 |
| 2004/0039647 | A1* | 2/2004 | Roche | 705/26 |
| 2004/0064786 | A1 | 4/2004 | Ikeda et al. | |
| 2004/0080772 | A1* | 4/2004 | Snyders | 358/1.14 |
| 2004/0187022 | A1* | 9/2004 | Asada et al. | 713/200 |
| 2005/0068546 | A1* | 3/2005 | Kuo et al. | 358/1.1 |
| 2005/0102442 | A1* | 5/2005 | Ferlitsch | 710/15 |
| 2005/0125269 | A1* | 6/2005 | Batra et al. | 705/7 |
| 2005/0251573 | A1* | 11/2005 | Merkow et al. | 709/226 |
| 2006/0235964 | A1* | 10/2006 | Childress et al. | 709/224 |
| 2010/0182635 | A1* | 7/2010 | Rebert et al. | 358/1.15 |

FOREIGN PATENT DOCUMENTS
JP   2004-164570 A   6/2004

* cited by examiner

*Primary Examiner* — King Y Poon
*Assistant Examiner* — Vincent R Peren
(74) *Attorney, Agent, or Firm* — Canon USA, Inc. IP Division

(57) ABSTRACT

An apparatus generates a processing route defining a processing order of plural processing processes to process print data. In the apparatus, a selection unit selects devices that can process the print data according to output setting information, and a generation unit generates at least one processing route for processing the print data by combining the selected devices for executing the plural processing processes. The apparatus determines a security level of each generated processing route based on a defined condition, and determines a processing route for processing the print data based on the determined security level.

3 Claims, 32 Drawing Sheets

FIG.15

|  | IN-LINE TYPE | NEAR-LINE TYPE | OFF-LINE TYPE |
|---|---|---|---|
| DEVICE | 3 | 2 | 1 |

|  | ENCRYPTED | NON-ENCRYPTED |
|---|---|---|
| DEVICE | 3 | 1 |

FIG.17

|  | IN-LINE TYPE | NEAR-LINE TYPE | OFF-LINE TYPE |
|---|---|---|---|
| DEVICE | 3 | 2 | 1 |

FIG.18

| TRANSMISSION SOURCE \ TRANSMISSION DESTINATION | PRINTER A | PRINTER B | IN-LINE A (STITCHING MACHINE) | IN-LINE A (FOLDING MACHINE) | OFF-LINE C (CUTTING MACHINE) | NEAR-LINE D (STITCHING MACHINE) | NEAR-LINE E (FOLDING MACHINE) |
|---|---|---|---|---|---|---|---|
| PRINTER A | × | UNCONNECTABLE | 3 | 3 | 1 | 2 | 2 |
| PRINTER B | UNCONNECTABLE | × | UNCONNECTABLE | 3 | 1 | 2 | 2 |
| IN-LINE A (STITCHING MACHINE) | UNCONNECTABLE | UNCONNECTABLE | × | UNCONNECTABLE | UNCONNECTABLE | 2 | 2 |
| IN-LINE A (FOLDING MACHINE) | UNCONNECTABLE | UNCONNECTABLE | UNCONNECTABLE | × | UNCONNECTABLE | UNCONNECTABLE | 2 |
| OFF-LINE C (CUTTING MACHINE) | UNCONNECTABLE | UNCONNECTABLE | UNCONNECTABLE | UNCONNECTABLE | × | UNCONNECTABLE | 2 |
| NEAR-LINE D (STITCHING MACHINE) | UNCONNECTABLE | UNCONNECTABLE | UNCONNECTABLE | UNCONNECTABLE | UNCONNECTABLE | × | 2 |
| NEAR-LINE E (FOLDING MACHINE) | UNCONNECTABLE | UNCONNECTABLE | UNCONNECTABLE | UNCONNECTABLE | UNCONNECTABLE | | × |

FIG.19

| WORKFLOW NAME | WORKFLOW PROCESS | SECURITY LEVEL | DELIVERY TIME |
|---|---|---|---|
| WORKFLOW 1 | PRINTER A(A4) → IN-LINE A (STITCHING MACHINE) → IN-LINE A (FOLDING MACHINE) | 3 | 11/5 |
| WORKFLOW 2 | PRINTER A(A4) → IN-LINE A (STITCHING MACHINE) → NEAR-LINE E (FOLDING MACHINE) | 2 | 11/10 |
| WORKFLOW 3 | PRINTER A(A4) → NEAR-LINE D (STITCHING MACHINE) → NEAR-LINE E (FOLDING MACHINE) | 2 | 11/15 |
| WORKFLOW 4 | PRINTER A(A3) → OFF-LINE C (CUTTING MACHINE) → NEAR-LINE D (STITCHING MACHINE) → NEAR-LINE E (FOLDING MACHINE) | 1 | 11/8 |
| WORKFLOW 5 | PRINTER B(A4) → NEAR-LINE D (STITCHING MACHINE) → NEAR-LINE E (FOLDING MACHINE) | 2 | 11/1 |

FIG.20

| TRANSMISSION SOURCE \ TRANSMISSION DESTINATION | STORAGE SECTION | PRINTER A | PRINTER B | IN-LINE A (STITCHING MACHINE) | IN-LINE A (FOLDING MACHINE) | OFF-LINE C (CUTTING MACHINE) | NEAR-LINE D (STITCHING MACHINE) | NEAR-LINE E (FOLDING MACHINE) |
|---|---|---|---|---|---|---|---|---|
| PRINTER A | 1 | × | UNCONNECTABLE | 3 | 3 | 1 | 2 | 2 |
| PRINTER B | 3 | UNCONNECTABLE | × | UNCONNECTABLE | UNCONNECTABLE | 1 | 2 | 2 |
| IN-LINE A (STITCHING MACHINE) | 1 | UNCONNECTABLE | UNCONNECTABLE | × | 3 | UNCONNECTABLE | UNCONNECTABLE | 2 |
| IN-LINE A (FOLDING MACHINE) | 1 | UNCONNECTABLE | UNCONNECTABLE | UNCONNECTABLE | × | UNCONNECTABLE | UNCONNECTABLE | UNCONNECTABLE |
| OFF-LINE C (CUTTING MACHINE) | 3 | UNCONNECTABLE | UNCONNECTABLE | UNCONNECTABLE | UNCONNECTABLE | × | 2 | 2 |
| NEAR-LINE D (STITCHING MACHINE) | 3 | UNCONNECTABLE | UNCONNECTABLE | UNCONNECTABLE | UNCONNECTABLE | UNCONNECTABLE | × | 2 |
| NEAR-LINE E (FOLDING MACHINE) | 3 | UNCONNECTABLE | UNCONNECTABLE | UNCONNECTABLE | UNCONNECTABLE | UNCONNECTABLE | | × |

FIG.21

| WORKFLOW NAME | WORKFLOW PROCESS | SECURITY LEVEL | DELIVERY TIME |
|---|---|---|---|
| WORKFLOW 1 | PRINTER A(A4) → IN-LINE A (STITCHING MACHINE) → IN-LINE A (FOLDING MACHINE) | 1 | 11/5 |
| WORKFLOW 2 | PRINTER A(A4) → IN-LINE A (STITCHING MACHINE) → NEAR-LINE E (FOLDING MACHINE) | 1 | 11/10 |
| WORKFLOW 3 | PRINTER A(A4) → NEAR-LINE D (STITCHING MACHINE) → NEAR-LINE E (FOLDING MACHINE) | 1 | 11/15 |
| WORKFLOW 4 | PRINTER A(A3) → OFF-LINE C (CUTTING MACHINE) → NEAR-LINE D (STITCHING MACHINE) → NEAR-LINE E (FOLDING MACHINE) | 1 | 11/8 |
| WORKFLOW 5 | PRINTER B(A4) → NEAR-LINE D (STITCHING MACHINE) → NEAR-LINE E (FOLDING MACHINE) | 2 | 11/1 |

| | IMPORTANCE |
|---|---|
| ADDRESS | 4 |
| TEL. NO | 4 |
| NAME | 2 |
| ACCOUNT NO. | 5 |
| DELIVERY TIME | 1 |

FIG.27

| STATUS CONDITIONS | SECURITY LEVEL COEFFICIENT |
|---|---|
| PRECEDING JOB | 0.9 |
| NO PRECEDING JOB | 1 |
| MALFUNCTIONED | 0.5 |
| INTERMEDIATE PRINT PRODUCT CONVEYANCE TIME | $0.1 \times (10-h)$ |

FIG.28

| TRANSMISSION SOURCE \ TRANSMISSION DESTINATION | PRINTER A | PRINTER B | IN-LINE A (STITCHING MACHINE) | IN-LINE A (FOLDING MACHINE) | OFF-LINE C (CUTTING MACHINE) | NEAR-LINE D (STITCHING MACHINE) | NEAR-LINE E (FOLDING MACHINE) |
|---|---|---|---|---|---|---|---|
| PRINTER A | × | UNCONNECTABLE | ST-A1 | ST-A2 | 3 | 2 | ST-A3 |
| PRINTER B | UNCONNECTABLE | × | UNCONNECTABLE | 1 | 3 | 2 | ST-A4 |
| IN-LINE A (STITCHING MACHINE) | UNCONNECTABLE | UNCONNECTABLE | × | × | UNCONNECTABLE | UNCONNECTABLE | ST-A5 |
| IN-LINE A (FOLDING MACHINE) | UNCONNECTABLE | UNCONNECTABLE | UNCONNECTABLE | UNCONNECTABLE | UNCONNECTABLE | UNCONNECTABLE | UNCONNECTABLE |
| OFF-LINE C (CUTTING MACHINE) | UNCONNECTABLE | UNCONNECTABLE | UNCONNECTABLE | UNCONNECTABLE | × | 2 | 2 |
| NEAR-LINE D (STITCHING MACHINE) | UNCONNECTABLE | UNCONNECTABLE | UNCONNECTABLE | UNCONNECTABLE | UNCONNECTABLE | × | 2 |
| NEAR-LINE E (FOLDING MACHINE) | UNCONNECTABLE | UNCONNECTABLE | UNCONNECTABLE | UNCONNECTABLE | UNCONNECTABLE | | × |

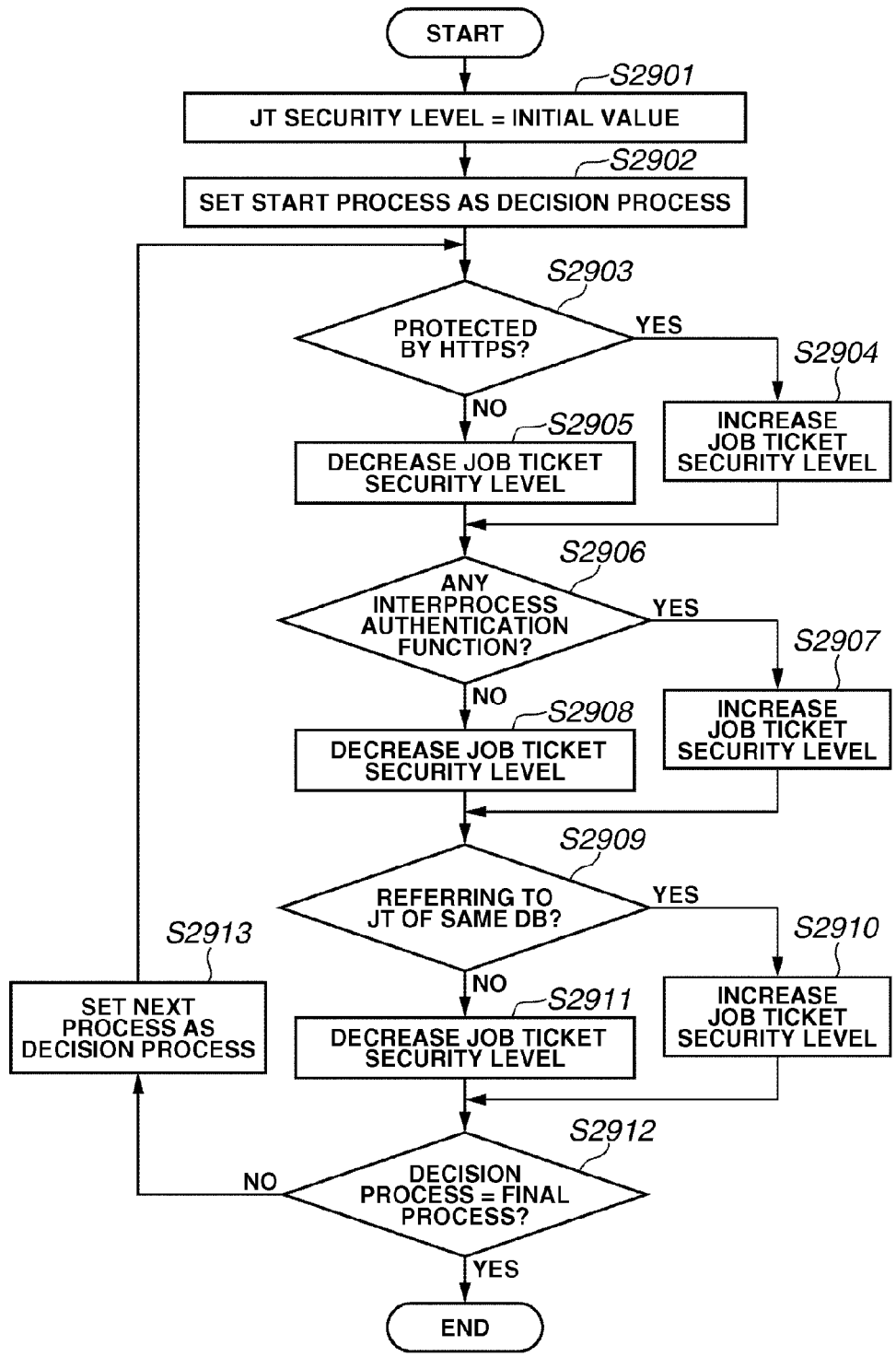

FIG.33

○ WORKFLOW 1    SECURITY LEVEL: 3    DELIVERY TIME: 11/5
○ WORKFLOW 2    SECURITY LEVEL: 2    DELIVERY TIME: 11/10
○ WORKFLOW 3    SECURITY LEVEL: 2    DELIVERY TIME: 11/15
○ WORKFLOW 4    SECURITY LEVEL: 1    DELIVERY TIME: 11/8
● WORKFLOW 5    SECURITY LEVEL: 2    DELIVERY TIME: 11/1

OK

APPARATUS, METHOD, AND PROGRAM FOR AUTOMATICALLY GENERATING A SET OF POSSIBLE PRINT JOB WORKFLOWS AND SELECTING A MOST SECURE PRINT JOB WORKFLOW FROM THE SET OF POSSIBLE PRINT JOB WORKFLOWS

BACKGROUND OF THE INVENTION

1. Field of the Invention

The present invention relates to an information processing apparatus and an information processing method for executing sequential processing including plural processing processes, and also relates to a program capable of executing information processing.

2. Description of the Related Art

The present commercial printing industries are typically based on a print-ordering system capable of receiving, from clients, print requests for various products (e.g., magazines, newspapers, catalogs, advertisements, and gravures), creating printed products requested by the clients, and delivering the printed products to respective clients.

The commercial printing industries generally use large-scale printing apparatuses, such as offset printing machines, to perform various processes including document entry, design and/or layout, comprehensive layout (print output for presentation), correction (layout correction and color correction), proof print, camera-ready block copy creation process, printing process, post-processing process, and delivery.

The camera-ready block copy creation is inevitably required when the above-described printing machines are used. Once a camera-ready block copy is created, correcting the block copy is not easy and the cost increases because a careful proof work (i.e., check of layout and confirmation of color) is required. As described above, the conventional printing industries use large-scale apparatuses and require a long time to finish a print product requested by each client. Furthermore, each work requires expertise information (i.e., know-how of expert).

On the other hand, highly-advanced technologies of recent electrophotographic printing apparatuses and inkjet printing apparatuses can realize the print on demand (hereinafter, referred to as POD) market comparable to the printing service provided by the conventional printing industries.

The POD system is useful in processing a relatively large number of print jobs in a short period of time without using large-scale apparatuses and systems. The POD system can utilize best performances of digital image forming apparatuses, such as digital copying machines and digital multifunction peripherals, to obtain a digital print of electronic data which cannot be realized by the above-described conventional printing system using large-scale printing machines or printing methods. According to the POD system, management and control of printing processes can be greatly digitized and computerized compared to the conventional printing system.

Furthermore, the POD system can use a workflow including plural processing processes (e.g., pre-print process, print process, and post-print process) required for outputting a print result. The printing system can execute the print processing according to the workflow and can efficiently obtain a print result requested by a client (orderer).

According to a method for automatically creating a workflow discussed in Japanese Patent Application Laid-open No. 2004-164570, a workflow creation apparatus holds environment information (e.g., output conditions including attribute values of a final output product, workflow creation rules stored beforehand, presence of processing modules, and designation of computers that can execute respective processing modules).

However, according to the method discussed in Japanese Patent Application Laid-open No. 2004-164570, the security level is not taken into consideration although a workflow for obtaining a final output product can be automatically created.

For example, if a created workflow includes a print process and a post-print process, the system executes the post-print process after accomplishing the print process. A print apparatus and a post-print processing apparatus may be physically spaced far from each other. A worker is required to manually move or shift a print product from the print apparatus to the post-print processing apparatus. In this case, leakage of information may occur due to loss of the print product. Furthermore, delivery of a print product is required if the print apparatus and the post-print processing apparatus are not placed on the same floor or in the same site. In such a case where a print product needs to be physically delivered from one location to another, the leakage of information is more likely to occur.

SUMMARY OF THE INVENTION

Exemplary embodiments of the present invention are directed to a technique for determining a workflow for executing output processing with reference to a security level of each workflow, when plural workflows are creatable for obtaining a final output product.

According to an aspect of the present invention, at least one exemplary embodiment provides an information processing apparatus configured to generate a processing route defining a processing order of plural processing processes to process output information including output setting information and print data. The information processing apparatus includes: a selection unit configured to select devices that can process the print data according to the output setting information; a generation unit configured to generate at least one processing route for processing the print data by combining the devices selected by the selection unit for executing the plural processing processes; a first determination unit configured to determine a security level of each generated processing route based a defined condition; and a second determination unit configured to determine a processing route for processing the print data based on the security level determined by the first determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 15 illustrates an example of a print product security level table.

FIG. 16 illustrates an example of a job ticket security level table (storage section).

FIG. 17 illustrates an example of a job ticket security level table (interprocess).

FIG. 18 illustrates an example of a print product security level table (interprocess) obtainable from print product security level calculation processing.

FIG. 19 illustrates an example of print product security levels of workflows obtainable from print product security level calculation processing.

FIG. 20 illustrates an example of job ticket security levels (interprocess) obtainable from job ticket security level calculation processing.

FIG. 21 illustrates an example of job ticket security levels of workflows obtainable from job ticket security level calculation processing.

FIG. 25 illustrates an example of an importance table.

FIG. 27 illustrates an example of a security level coefficient table.

FIG. 28 illustrates an example resulting from the processing using security level coefficients.

FIG. 29 is a flowchart showing exemplary security level addition processing.

FIG. 33 illustrates an example of a user interface (UI) displaying a processing result.

DETAILED DESCRIPTION OF THE EMBODIMENTS

Figure 1:
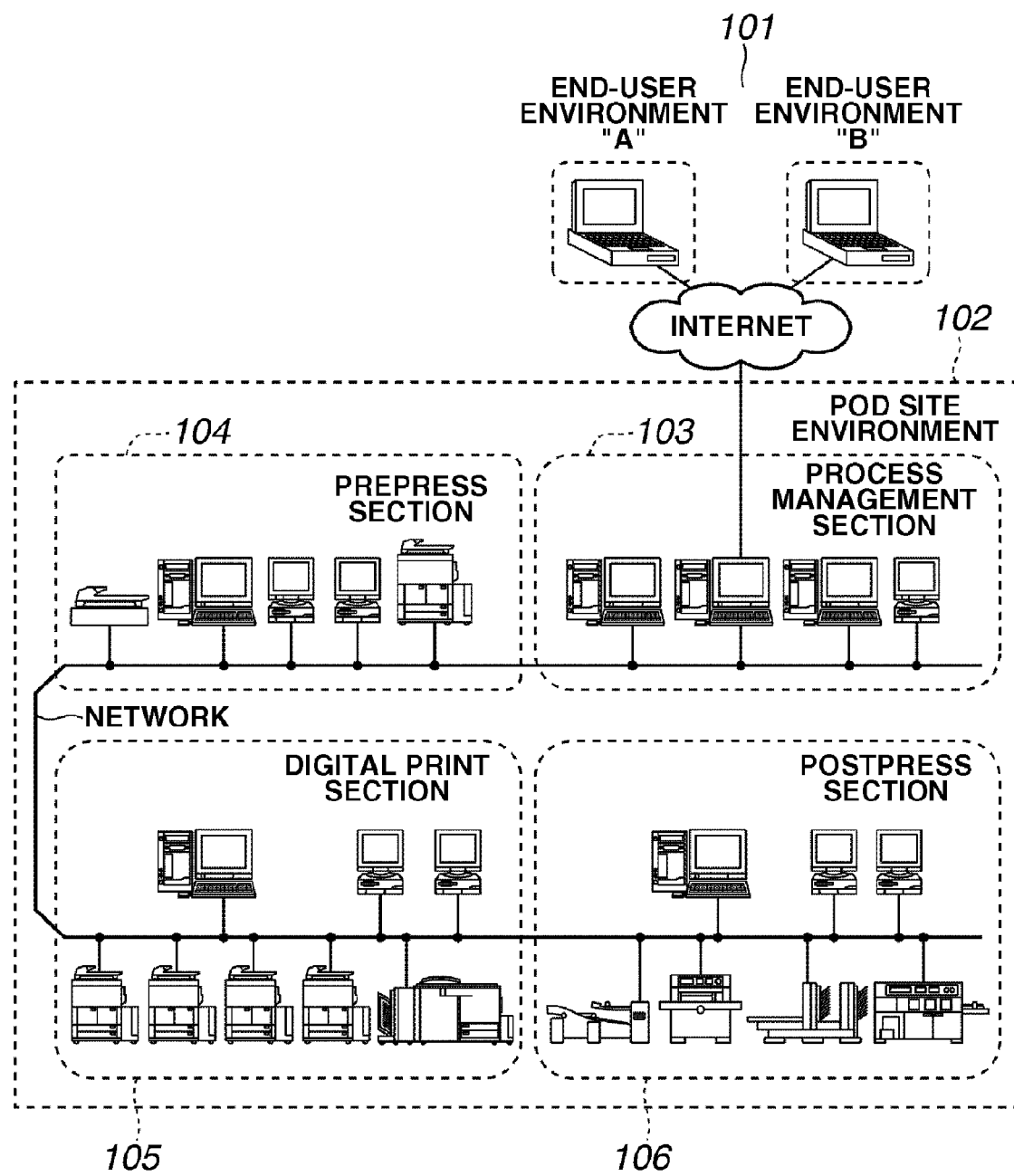
FIG. 1 illustrates an exemplary arrangement of an information processing system to which embodiments of the present invention can be applied.

The following description of exemplary embodiments is merely illustrative in nature and is in no way intended to limit the invention, its application, or uses.

Processes, techniques, devices, and systems as known by one of ordinary skill in the art may not be discussed in detail but are intended to be part of the enabling description where appropriate.

For example, certain circuitry for image processing, data processing, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is defined in one figure, it may not be discussed for following figures.

Exemplary embodiments will be described in detail below with reference to the drawings.

First Exemplary Embodiment

<Entire System Arrangement>

Figure 34:
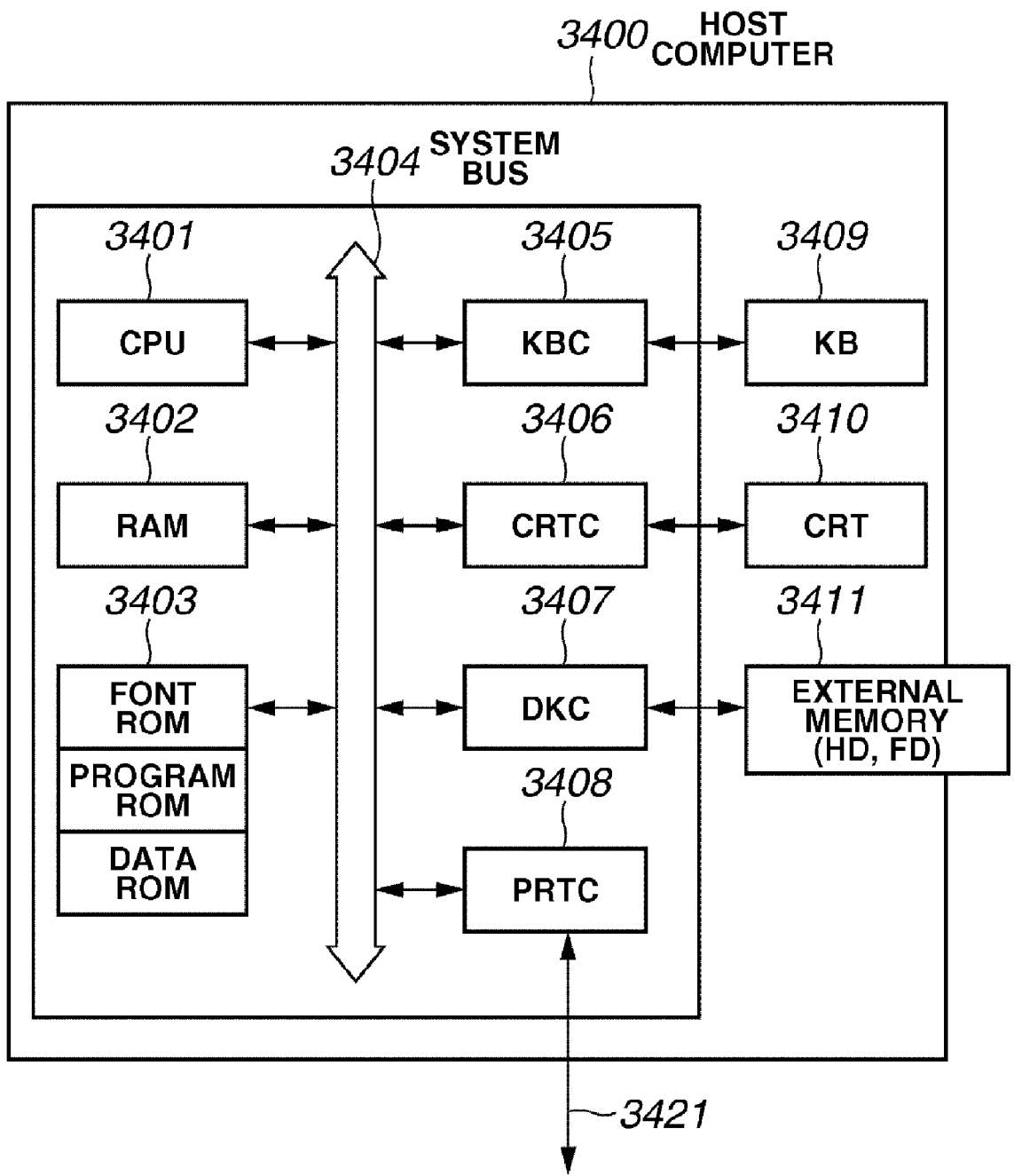
FIG. 34 is a block diagram illustrating a hardware arrangement of an information processing apparatus.

FIG. 34 is a block diagram illustrating an exemplary host computer (i.e., a client computer or an information processing apparatus) according to a first exemplary embodiment. The present invention can be realized by a single device or a system including plural devices, even if the devices are connected via a network (e.g., LAN or WAN). For example, the arrangement shown in FIG. 34 can be applied to a management information system (MIS) server.

In FIG. 34, a host computer 3400 includes a CPU 3401 capable of executing document processing, including graphic, image, character, and table (including spreadsheet) processing, based on a program ROM or a document processing program stored in a ROM 3403. The CPU 3401 can perform integrated control of internal devices connected to a system bus 3404.

A program ROM of the ROM 3403 or an external memory 3411 can store an operating system program (referred to as "OS") which serves as a control program of the CPU 3401. A font ROM of the ROM 3403 or the external memory 3411 can store font data used for the above-described document processing. A data ROM of the ROM 3403 or the external memory 3411 can store various data used for the above-described document processing.

A RAM 3402 can function as a main memory or a work area of the CPU 3401. A keyboard controller (KBC) 3405 can control key input from a keyboard 3409 (or any other pointing device). A CRT controller (CRTC) 3406 can control display of a cathode-ray tube (CRT) display 3410.

A disk controller (DKC) 3407 can control access to the external memory 3411, such as hard disk (HD), which can store a boot program, applications, font data, and printer control command creation programs (hereinafter, referred to as "printer drivers"). Furthermore, the DKC 3407 can control access to a floppy disk.

A printer controller (PRTC) 3408 can communicate with external devices via a predetermined bidirectional interface 3421. The CPU 3401 can execute expansion (rasterization) processing of outline font data in display information RAM set in the RAM 3402. Thus, WYSIWYG can be realized on the CRT 3410.

Furthermore, the CPU 3401 can open various windows registered beforehand based on commands entered by a user who can use a mouse cursor (not shown) on the CRT 3410. To execute printing of a document, a user can open a print setting window to set a print processing method for a printer driver including settings of a printer and selection of a print mode.

FIG. 1 illustrates an exemplary arrangement of a system to which embodiment of the present invention can be applied. The system includes one (or plural) end-user environment 101, and a print on demand (POD) site environment 102 connected via the Internet.

At least one client (orderer) who makes a print order request is present in the end-user environment 101. Each client (orderer), operating a client PC, can request a print job or confirm the status of each job from the end-user environment 101.

The POD site environment 102 includes a process management section 103, a prepress section 104, a digital print section 105, and a postpress section 106.

The process management section 103 can instruct works in respective processes of the process management section 103, the prepress section 104, the digital print section 105, and the postpress section 106 in the POD site environment 102. In other words, the process management section 103 can realize integrated management of workflows in the system including computers and various devices.

The process management section 103 can receive jobs from the end-user 101 and store the received jobs. Furthermore, the process management section 103 can assemble two or more individual work processes as a workflow based on the designation of the job requests received from the end-user 101, and can efficiently schedule the work processes for individual devices or workers.

The prepress section 104 can scan a paper document received from an end-user using a scan device (e.g., scanner/multifunction peripheral (MFP)) based on work instructions of a prepress job received from the process management section 103, and can capture an image of the scanned document as an image file into a prepress server or a client PC.

Furthermore, the prepress section 104 can execute correction of an image, merging of files, insertion/deletion of a page, and various page layout/edit and imposition processing. If necessary, the prepress section 104 can execute proofing for confirming the layout and the tint of a final output product.

The digital print section 105 can copy a paper document received from an end-user with a monochrome MFP or a color MFP, according to work instructions of a print job received from the process management section 103 or the prepress section 104. Furthermore, the digital print section 105 can cause a print device to print a document/image file received from a client PC via a printer driver or a hot folder from an end-user, a scan image file scanned by a scan device, and its edit file.

The postpress section 106 can control post-processing devices (e.g., a paper folding machine, a saddle stitch binding machine, a case binding machine, a paper cutting machine, an inserting machine, and a collator) according to work instructions of a postpress job received from the process management section 103, the prepress section 104, or the digital print section 105. The postpress section 106 can execute various finishing processing, including paper folding, saddle stitch bookbinding, case bookbinding, paper cutting, inserting, and collation, with respect to recording paper sheets output from the digital print section 105.

Figure 2:
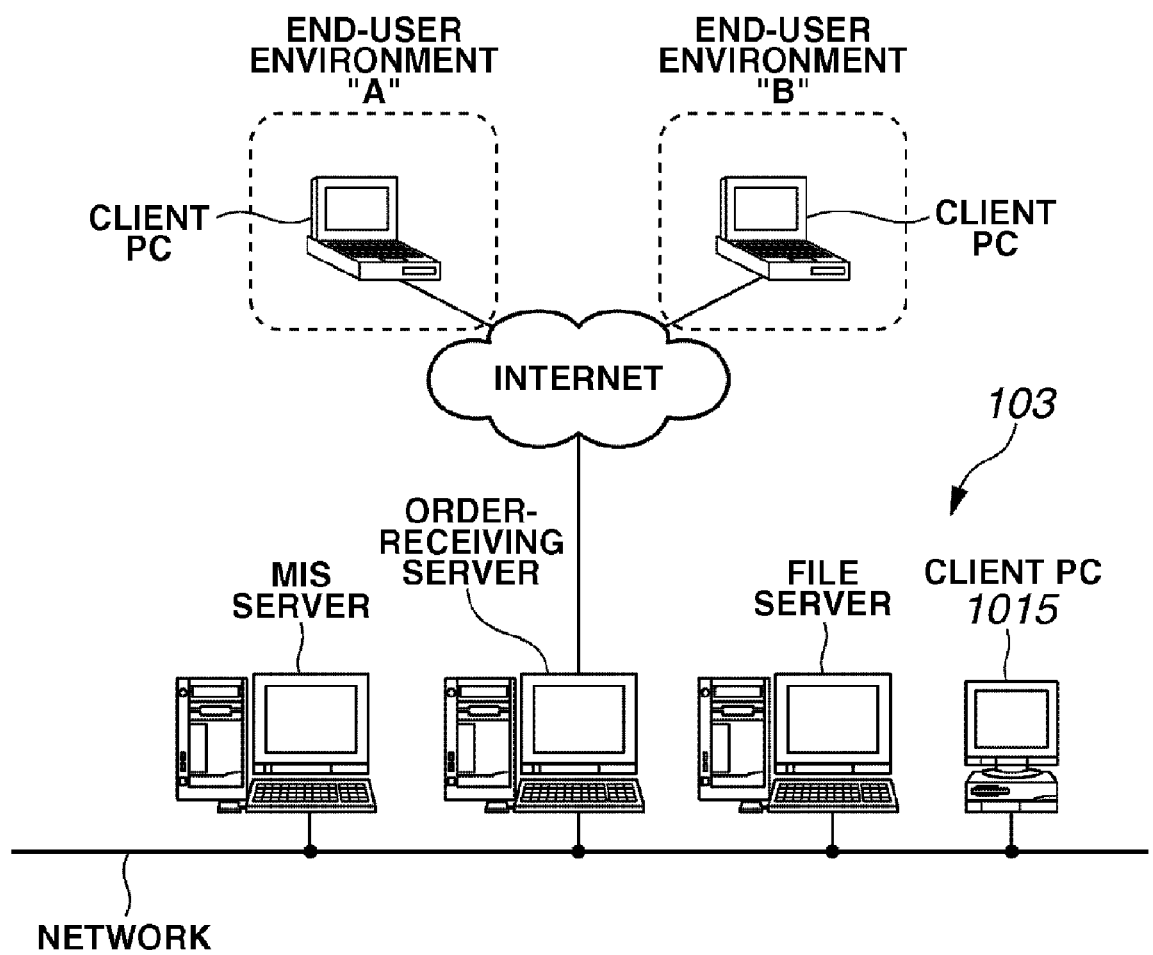
FIG. 2 illustrates a system arrangement of a process management section.

FIG. 2 illustrates an exemplary arrangement of the process management section 103. The process management section 103 includes a management information system (MIS) server, an order-receiving server, a file server, and a client PC, which are connected to a network.

The MIS server can manage various workflows, including from reception of an order to delivery of a product, in the system and can manage various administrative information and sales information.

The order-receiving server can receive a job from the end-user environment 101 via the Internet and can allocate identification information (e.g., ID number) to each received job to manage the job. Furthermore, the order-receiving server can transmit the ID number and management information to the MIS server, and also can transmit image data and other information to succeeding processes according to an instruction of the MIS server.

The file server is a document management server that can store each job received from an end-user so as to be used in case of reordering the same document. In general, the file server can store image data together with setting information (job ticket) used in the previous job.

The MIS server, the order-receiving server, the file server, and the client PC in the process management section 103 can exchange information using a job ticket describing work instructions of a job which can be referred to as job definition format (JDF). The job ticket can be defined as data describing processing required for outputting requested contents when ordered from a device in the system. Using the job ticket, the process management section 103 can transfer a job and issue a control command, to cooperate with the prepress section 104, the digital print section 105, and the postpress section 106 to realize a totally automated workflow.

<System Arrangement of Prepress Section>

Figure 3:
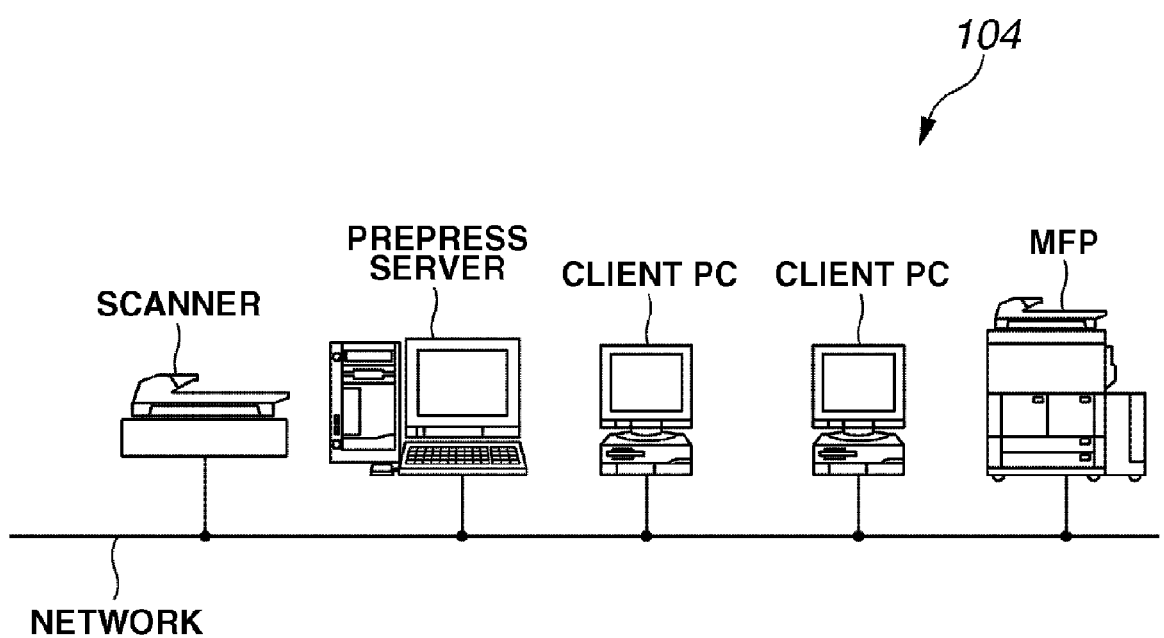
FIG. 3 illustrates a system arrangement of a prepress section.

FIG. 3 illustrates an exemplary arrangement of the prepress section 104. The prepress section 104 shown in FIG. 3 includes a prepress server that can execute various page layout/edit and imposition processing. The prepress server can control a scanner and a scan device of an MFP to capture an image of a paper document received from an end-user as a scan image file, and can execute image correction including correction of obliqueness and removal of black points.

Furthermore, the prepress server 104 can combine plural document/image files received from end-users and plural scan image files scanned by a scan device. Furthermore, the prepress server 104 can execute insertion/deletion of pages, addition of page numbers and annotations, insertion of index and cover and interleaf slips, and designation of N-up printing and multi-page printing.

The prepress section can include one prepress server and plural client PCs as shown in FIG. 3, or can include plural client PCs only.

When a copy job is received from an end-user, a worker operates the scan device (e.g., scanner/MFP) to capture an image of a paper document. Then, the prepress server and the client PCs input a scan image file. When the scan image is inclined, the prepress server and the client PCs perform processing for correcting the obliqueness of scan image. Furthermore, when the scan image includes punch holes or spoiled portions, the prepress server and the client PCs perform processing for removing black points (i.e., images of punch holes and spoiled portion).

Furthermore, when a print job is received from an end-user, a worker controls the prepress server and the client PCs to input a document/image file received from the end-user.

If plural document/image files are received from end-users, or when plural scan image files are obtained by the scan device, the prepress server and the client PCs can combine these files.

Furthermore, when editing a file or a scan image file is required, a worker can operate the prepress server and the client PCs to insert additional page(s) to or delete page(s) from an edit object file while confirming the layout of plural pages. Furthermore, the prepress section can execute various page layout/edit and imposition processing. For example, a worker can operate the prepress server and the client PCs to add page numbers and annotations (e.g., characters and images including watermarks and logos representing confidential information).

Furthermore, the prepress server and the client PCs can execute various page layout/edit and imposition processing including designation of N-up imposition or successive-page printing (printing plural pages on a single printed surface), insertion of index and cover and interleaf slips, and designation of post-processing (e.g., stapling, punching, and Z-shaped folding).

The prepress section can realize one-to-one marketing (e.g., printing of direct mails or pamphlets dedicated to individual clients). For example, the prepress section can constitute a variable printing system that can cooperate with the prepress server and another server, if their databases are available, to perform processing for printing a plurality of sets of the same document while changing the address and associated data for individual customers.

In the printing industries, before starting plate-making and print processes, a preliminary print (generally referred to as "color comprehensive layout") is often performed for the purpose of presentation to the advertiser. For example, the desk top publishing (DTP) using a personal computer to create publication products can be used to perform the color comprehensive layout. Furthermore, a color hard copy outputting a digital color image processed by the color electronic prepress system (CEPS), which is generally used for image correction and composition in the print process, can be used for the color comprehensive layout.

The POD using an MFP or other printers can perform proof output processing, including layout confirmation corresponding to the comprehensive layout, simple tint confirmation, and detailed tint confirmation corresponding to the proof, using the same color MFP or color printer.

The prepress section can output a proof print at an MFP, if necessary, to confirm the layout and tint of a final output product.

As described above, the prepress section 104 includes the prepress server, the client PCs, the scanner, and the MFP, which are connected via a network. Respective devices of the prepress section 104 can perform job transfer processing and control command issuing processing via the network, to process a job received by the prepress section 104.

<System Arrangement of Digital Print Section>

Figure 4:
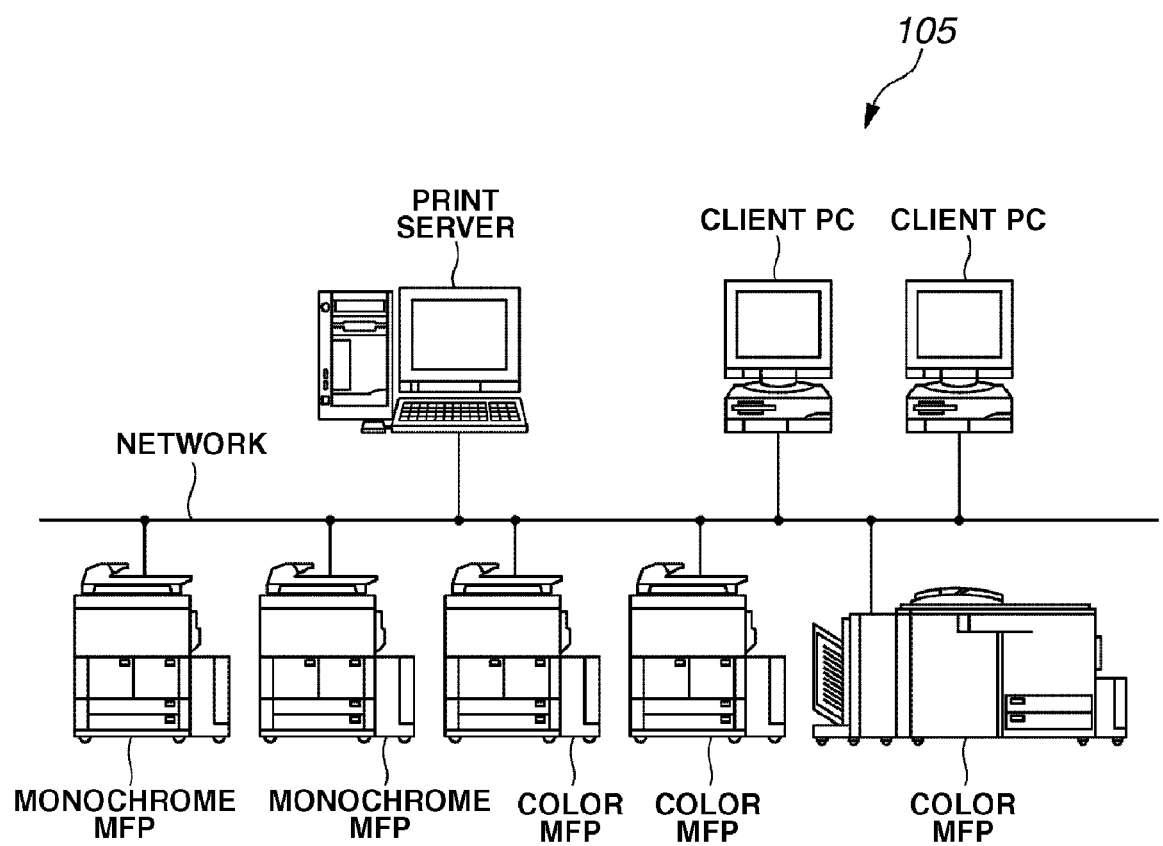
FIG. 4 illustrates a system arrangement of a digital print section.

FIG. 4 illustrates an exemplary arrangement of the digital print section 105. As shown in FIG. 4, the digital print section 105 includes a print server, two client PCs, three color MFPs, and two monochrome MFPs, which are connected to a network.

The print server has two roles. The first role of the print server is transmission and reception of information to and from an external device of the digital print section 105. First, the print server can input image information and setting information of an entered job and can transmit status information to an external device upon finishing the job.

The second role of the print server is management and control of internal devices in the digital print section 105. The print server can manage jobs entered from external devices and jobs generated in the digital print section 105 and can monitor the status of all devices and jobs processed in the digital print section 105. Furthermore, the print server can execute various controls including interruption of job, change of settings, restart of print, as well as copy, transfer, and deletion of job.

The client PCs can edit application files entered from external devices, instruct a print operation, and input a print-ready file. Furthermore, the client PCs can monitor and control the devices and jobs managed by the print server.

The color MFPs and the monochrome MFPs are image forming apparatuses having various functions including scan, print, and copy functions. The color MFPs and the monochrome MFPs are different in processing speed and cost, and can be selectively operated depending on purposes.

<System Arrangement of Postpress Section>

Figure 5:
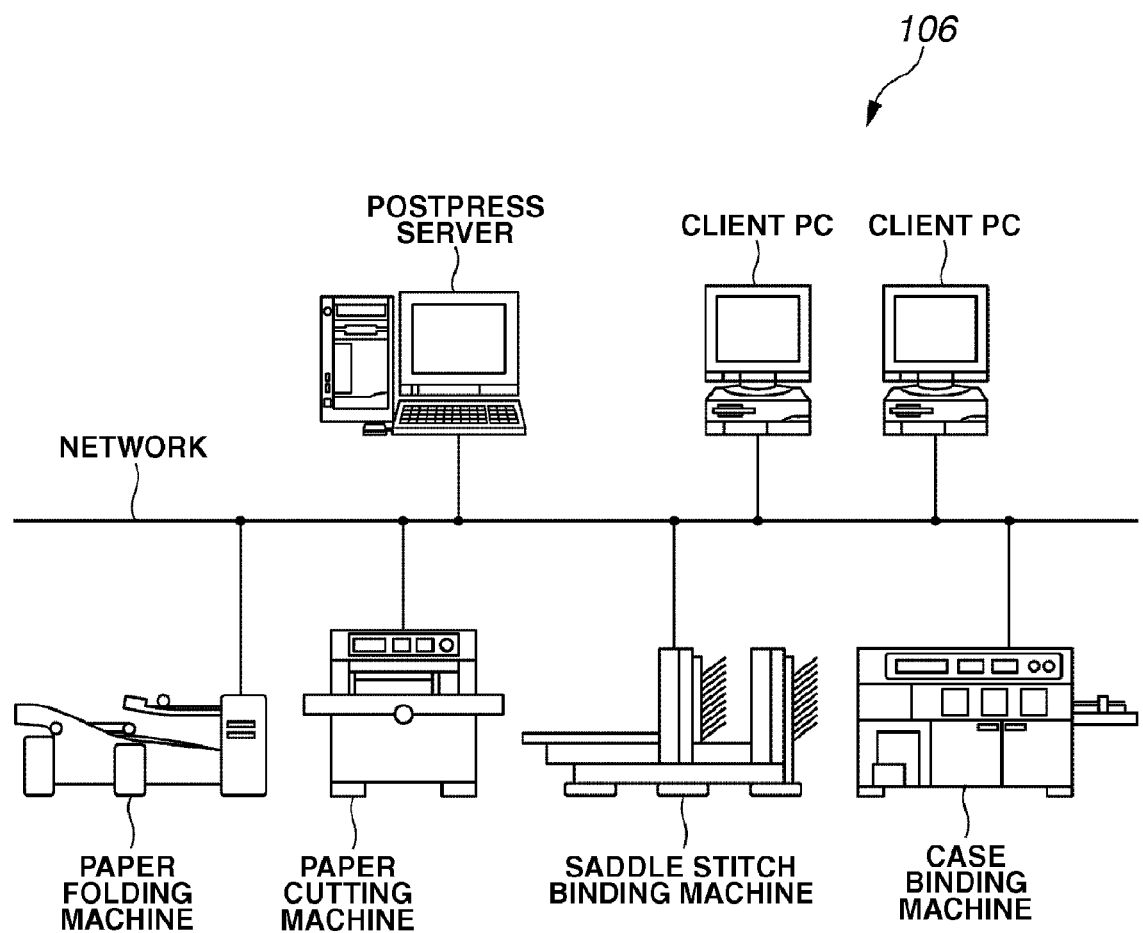
FIG. 5 illustrates a system arrangement of a postpress section.

FIG. 5 illustrates an exemplary arrangement of the postpress section 106. As shown in FIG. 5, the postpress section 106 includes a postpress server, client PCs, and post-processing devices including a paper folding machine, a paper cutting machine, a saddle stitch binding machine, and a case binding machine, which are connected to a network.

The postpress server is a computer capable of controlling and managing the post-processing processes. The postpress server can create conditions of the post-processing that can be finished by the postpress section 106 based on a job instruction received by the order-receiving server or a job instruction produced from the MIS server, and can instruct post-processing (finishing processing) according to an end-user's request. In general, the postpress server can use an information exchange unit (e.g., JDF) to communicate with external devices and exchange information with the post-processing devices in the postpress section 106 using internal commands and status.

The post-processing devices can be roughly classified into three categories (i.e., in-line finishers, near-line finishers, and off-line finishers) which are defined in the following manner.

(1) In-line Finisher

The in-line finishers are post-processing devices physically connected to MFPs and can directly receive printed sheets produced from the MFPs via paper paths (conveyance paths). Furthermore, the in-line finishers are electrically connected to the MFPs and can receive operational instructions and status confirmation from the MFPs.

(2) Near-line Finisher

The near-line finishers are post-processing devices not physically connected to MFPs via paper paths. Thus, workers (operators) of respective near-line finishers are required to manually convey and place (or set) output products. However, the near-line finishers are electrically connected to the MFPs and can transmit and receive information (e.g., operational instructions and status confirmation), via a network or communication medium, to and from the MFPs.

(3) Off-line Finisher

The off-line finishers are post-processing devices not physically connected to MFPs via paper paths and not electrically connected to the MFPs for transmission/reception of operational instructions and status confirmation. Thus, workers of respective off-line finishers are required to manually convey and place (or set) output products, manually input operation information and data, and confirm the status reported from the devices.

Furthermore, the post-processing devices can execute sheet processing processes applied to recording sheets printed by MFPs or other image forming apparatuses to finish the recording sheets into a bookbinding product requested by each end-user. The post-processing processes applied to the recording sheets include a paper cutting process, a saddle stitch bookbinding process, a paper folding process, and other processes.

The postpress server can manage various near-line finishers and, if necessary, can manage off-line finishers. For example, the postpress server can manage a stapler, a punching machine, an inserting machine, and a collator, in addition to the above-described processing machines. The postpress server can monitor the device status and the job status in the near-line finishers by performing successive polling according to a predetermined protocol and can manage the execution status of each job.

In the present exemplary embodiment, the above-described plural sheet processing processes can be performed by an integrated system including plural processing devices or can be performed by a single processing apparatus. Furthermore, the system of the present exemplary embodiment can be arranged so as to include some devices in an integrated processing system.

<Bookbinding Processing Based on JDF>

Figure 6:
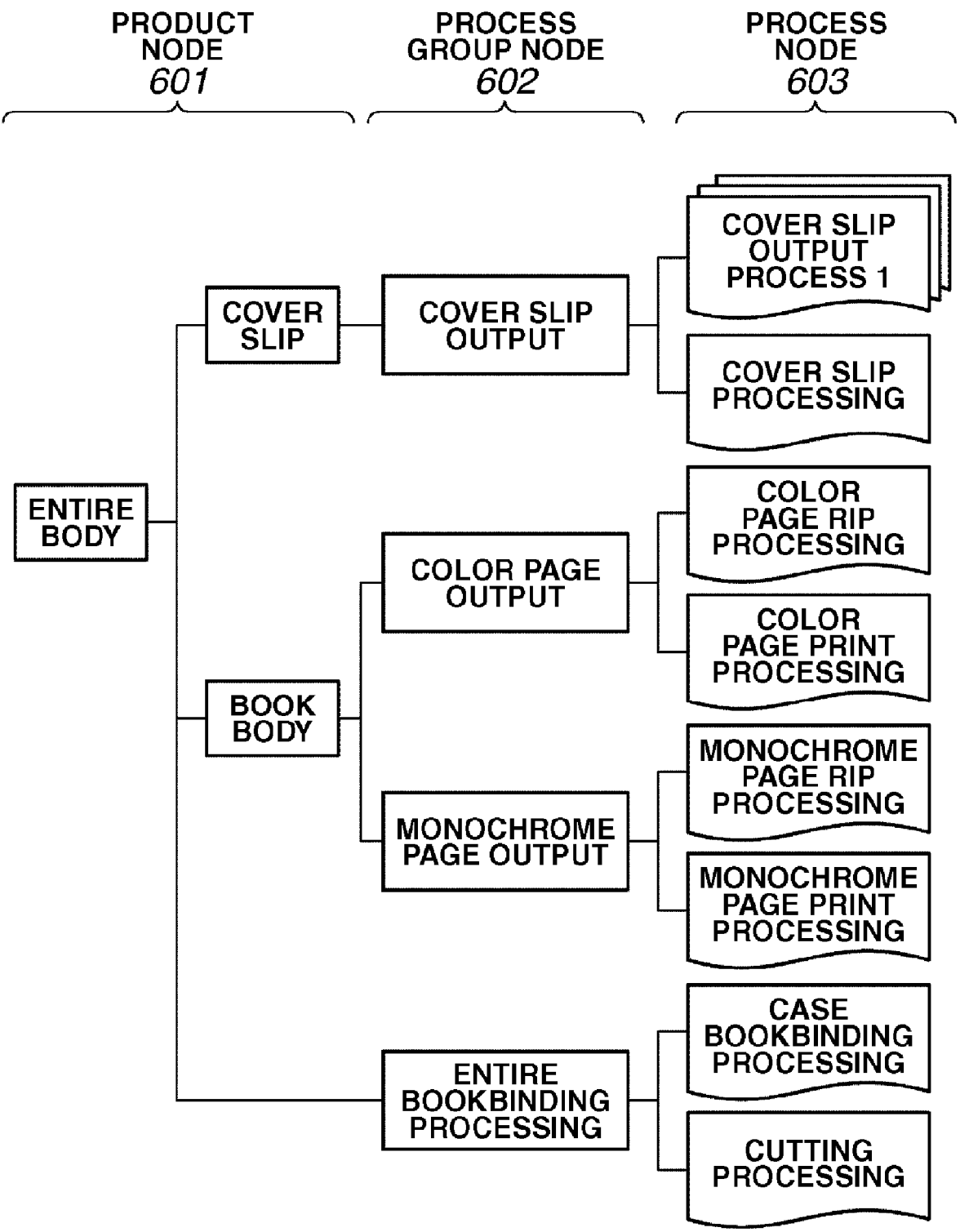
FIG. 6 illustrates a JDF-based book binding mechanism.

FIG. 6 illustrates a hierarchical structure showing exemplary bookbinding processing based on a job definition format (JDF).

Creation of a "book" includes various processes, such as creation of a cover slip, creation of a book body, binding of them, and delivery of the book to end-users.

JDF defines a product node 601 (i.e., a process for fabricating a physical output product), a process node 603 (i.e., a processing process for creating a product node), and a process group node 602 (i.e., an assembly of process nodes (intermediate elements)) for creating a product node.

FIG. 6 shows an example of JDF including case bookbinding and cutting processing applied to a cover slip (i.e., print result) and a book body (i.e., contents) for fabricating a book. A product node "cover slip" includes only one process group node "cover slip output." The process group node "cover slip output" includes a process node "cover slip output process 1" for outputting a cover slip and a process node "cover slip processing" for applying a surface finish treatment (e.g., laminate and varnishing) to the output slip.

A product node "book body" includes two process group nodes, i.e., "color page output" and "monochrome page output." The process group node "color page output" includes two process nodes, i.e., "color page RIP processing" and "color page print processing." The process group node "monochrome page output" includes two process nodes, i.e., "monochrome page RIP processing" and "monochrome page print processing."

Furthermore, the JDF includes a process group node "entire bookbinding processing" for bookbinding the "cover slip" and the "book body" to fabricate a book. The process group node "entire book binding processing" includes two process nodes, i.e., "case bookbinding processing" and "cutting processing."

The above-described node information and attribute information are described in a JDF file. A JDF manager can create or change the JDF file.

On the other hand, a JDF worker (an apparatus) can receive a JDF file transmitted from the JDF manager and perform a required work based on the information described in the JDF file. Although not shown in FIG. 6, the process node 603 can specify a device that can execute the processing.

The MIS server (i.e., an essential apparatus in the process management section 103) can operate as a system server (which may be referred to as a management information system or an administrative management system) that can collect and analyze the information required for corporate administration and determination of management.

In general, the MIS server can be incorporated in a management system integrally managing various administrative information and sales information, including advertisement, reception of an order, estimation, planning, production, shipment, inventory, purchase, and sales.

Especially, in the printing industries, the MIS server can act as a print production process management system. The MIS server can integrally manage print production facilities and print production resources. Furthermore, the MIS server can provide a mechanism for automatically producing a total workflow, including from reception of an order to delivery of a product or collection of expense, based on a job ticket describing work instructions for processing a print job referred to as JDF. The print job can include a JDF and print data.

The MIS server is a server computer having an important role in the administrative management system. The MIS server can issue a JDF describing work instructions for each job in each process in the POD site environment, based on the job designated by an end-user. The present printing system, including computers and various devices, can execute print processing according to the contents described in the JDF.

Furthermore, the MIS server can control a job messaging format (JMF) exchanged between processes in the POD site environment. The MIS server can obtain, from the JMF, function or capability information of each device, status information of each device, and progress information of a received job. Thus, the MIS server can integrally manage workflows used in the printing system.

Furthermore, the MIS server has a process management function (represented by a workflow editor or a workflow engine) and a scheduler function capable of managing time schedule of jobs and devices. Furthermore, the MIS server can cooperate with an application having similar functions. The MIS server can combine works in respective processes as a workflow and can instruct execution of the workflow. Furthermore, the MIS server can automatically produce a workflow in each process by efficiently scheduling the work in each device or in each worker.

Various functions in the MIS server can be used by an administrator, a process manager, a site operator, a sales staff, and other various workers, via their client PCs. Therefore, a user ID and a password may be required. A license to use application software may be required.

<Mechanism of Order-receiving Server>

The order-receiving server can receive a job request sent from a client PC in the end-user environment 101 via the Internet or a communication medium. In this respect, the order-receiving server is an intervenient of electronic commerce (EC) in the POD system. The order-receiving server is an electronic shop on a web page accessible via the Internet from each end-user environment.

For example, to place an order of a print job, a client performs user authentication using a browser of the client PC in the end-user environment. Then, the client inputs print condition settings and other print request information to designate the print conditions. As a result, the client PC in the end-user environment transmits, via the Internet, electronic data of a document/image file (i.e., print object) together with the print condition settings and other print request information, to the order-receiving server. Thus, the order-receiving server can receive the information relating to the print processing.

The order-receiving server or each client PC in the end-user environment includes, for example, a hot folder. A client can store the document/image file (i.e., print object) and relating print condition settings and other print request information into the hot folder. The data stored according to the storage processing can be automatically transferred, if desirable. The hot folder is a virtual folder that can store, as attribute information, the print condition settings and other print request information. Plural hot folders can be created in a hard disk or other memory (not shown) provided in the order-receiving server or in each client PC of the end-user environment.

For example, an end-user can drag and drop a document/image file (i.e., print object) from each client PC of the end-user environment to the hot folder. As a result, a monitoring program of the order-receiving server or each client PC of the end-user environment can recognize the presence of the print requested document/image file. Then, the order-receiving server can read the information, through the processing based on the print condition settings and other print request information stored in the hot folder.

On the other hand, in the case of requesting a copy job, a user sends a paper document (i.e., copy object) as a physical medium, for example, using a delivery service, instead of transmitting electronic data of a document/image file. Then, by using a browser of the client PC of the end-user environment, a user inputs copy condition settings for designating copy conditions and other copy request information. In this case, a paper document (i.e., copy object) separately transmitted and the copy condition settings and other copy request information transmitted to the order-receiving server are correlated with each other and subjected to copy processing.

<Workflow in Order-placing and Order-receiving Processing>

Figure 7:
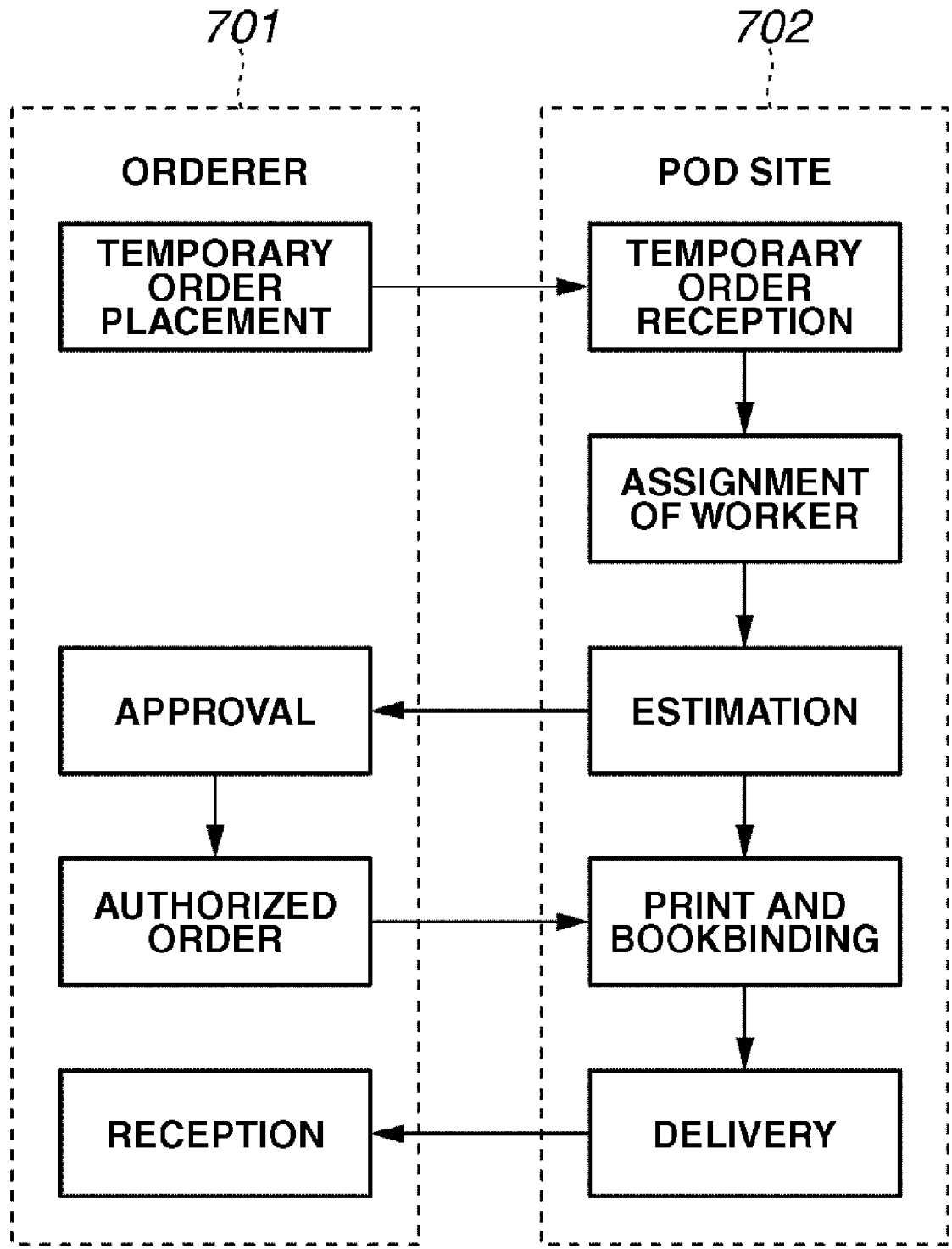
FIG. 7 illustrates a workflow including order-placing and order-receiving processes.

FIG. 7 illustrates an example of a workflow including order-placing and order-receiving processes. In FIG. 7, a left block 701 includes work processes of an end-user (i.e., orderer) and a right block 702 includes work processes of a worker in the POD site. The orderer can send a temporary order to the order-receiving server of the POD site, using a web page on the Internet.

For example, to place an order of a print job, an orderer performs user authentication using a browser of the client PC in the end-user environment. Then, the orderer inputs print condition settings and other print request information to designate the print conditions. The input information is transmitted from the client PC in the end-user environment to the order-receiving server. The order-receiving server, functioning as a web server, can receive a temporary order of a print job.

Furthermore, to place an order of a copy job, an orderer sends a paper document (i.e., copy object) as a physical medium, for example, using a delivery service, instead of transmitting electronic data of a document/image file. Then, by using a browser of the client PC of the end-user environment, the orderer inputs copy condition settings for designating copy conditions and other copy request information. Thus, the physical medium and the input information are correlated with each other and subjected to copy processing in the POD site.

The order-receiving server in the POD site executes temporary order reception processing (reception and storage of a received temporary ordered job). The order-receiving server or the MIS server executes assignment of a worker for the received job.

For example, the assignment of a worker can be automatically executed by a scheduler of the order-receiving server, or can be manually executed by a manager of the workers.

Furthermore, the order-receiving server or the MIS server in the POD site estimates the cost of a temporary ordered job. More specifically, the order-receiving server or the MIS server calculates a total cost based on estimated costs relating to works and resources required for processing the requested job and other costs including a delivery fee, with reference to the print conditions and the copy conditions entered by the orderer. Then, the order-receiving server or the MIS server presents an estimated price to the orderer.

The orderer receives the estimated price. If the orderer approves the information (cost etc.) received from the order-receiving server, the orderer sends an authorized order to the order-receiving server of the POD site. In this case, the orderer may change the print conditions or the copy conditions for the temporary ordered job in the process of authorizing the order.

When the order-receiving server in the POD site receives the authorized order from the orderer, the processing devices start their operations to execute the ordered job in the process management section 103, the prepress section 104, the digital print section 105, and the postpress section 106.

After the print/bookbinding processing and other various processing have been accomplished in the POD site, a final product (i.e., print product) is delivered to a delivery destination designated beforehand by the orderer. Thus, the orderer (i.e., client) can receive the final product (i.e., print product).

<Workflow using Job Ticket>

Figure 8:
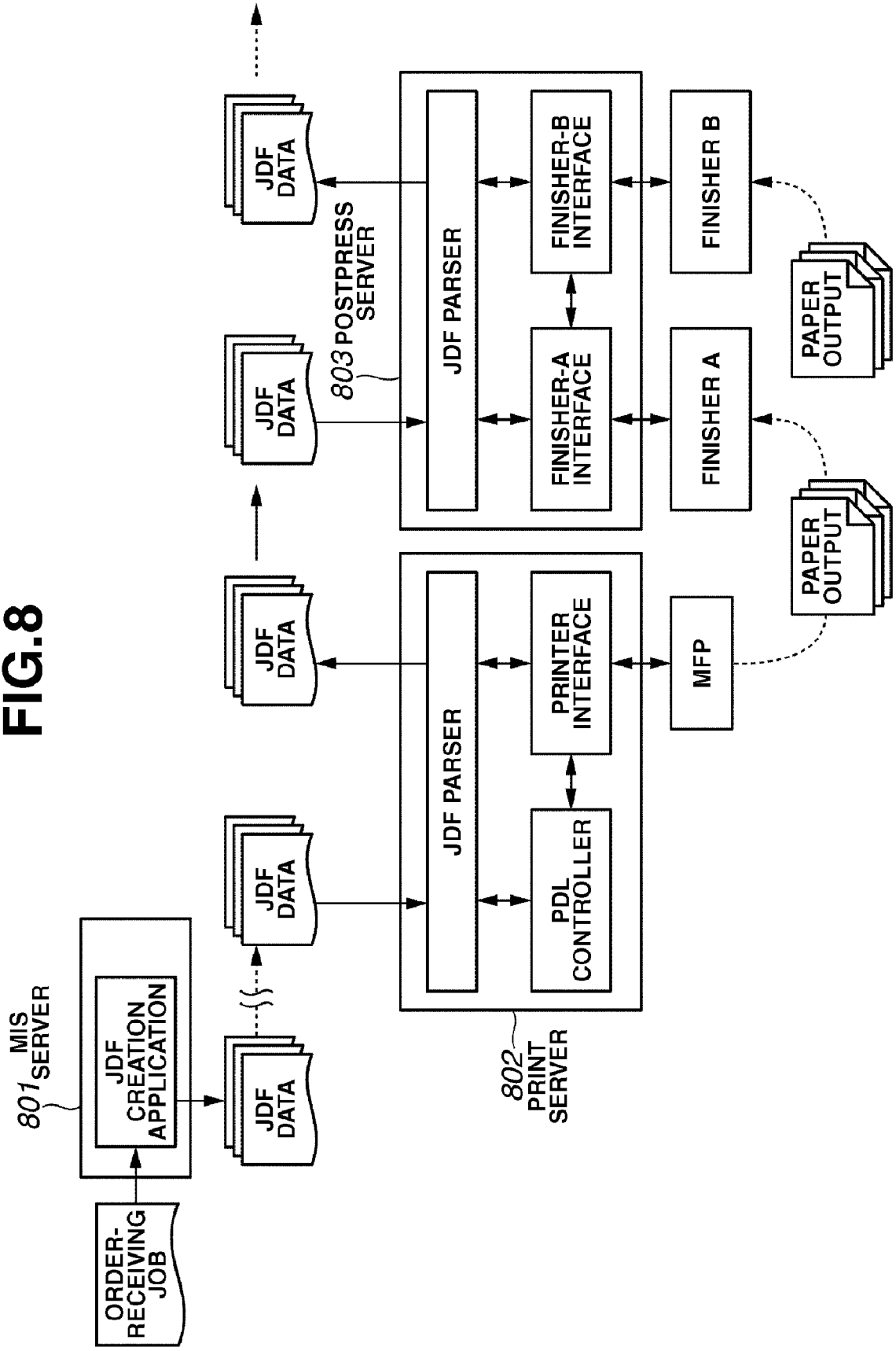
FIG. 8 illustrates a workflow using a job ticket.

FIG. 8 illustrates an exemplary workflow arrangement realized by a job ticket.

An MIS server 801 can manage workflows, including from reception of an order to delivery of a product, in a system and can manage various administrative information and sales information. The MIS server 801 includes a JDF creation application that can create JDF data corresponding to a job ticket that describes work instructions in a workflow.

A print server 802 can receive a job entered from a digital print section and can manage and control the digital print section. The print server 802 includes a JDF parser, a PDL controller, and a printer interface. The JDF parser can interpret JDF data. The PDL controller can process various PDL data including PDF/PS. The printer interface is connected to an MFP or another printer engine.

A postpress server 803 can receive a job entered into a postpress section, and can manage the postpress section. The postpress server 803 includes a JDF parser capable of interpreting JDF data, a finisher-A interface connected to a finisher A, and a finisher-B interface connected to a finisher B.

The workflow using a job ticket can be realized in the following manner.

When an order-receiving job is entered into the MIS server 801, the JDF creation application installed in the MIS server enables a worker to create JDF data corresponding to a job ticket that describes work instructions in a workflow.

When the created JDF data is transmitted to the print server 802, the JDF parser of the print server 802 interprets the JDF data and executes a job according to work instructions described in the JDF. For example, the JDF data can include output paper size, two-sided or one-sided printing, and N-up imposition. The JDF parser interprets work instruction contents and transmits the work instruction contents to the PDL controller. The PDL controller processes PDF/PS and other PDL data with reference to the contents of JDF data and controls, via the printer interface, the MFP to execute a printing operation.

When the created JDF data is transmitted to the postpress server 803, the JDF parser of the postpress server 803 interprets the JDF data and executes a job designating the postpress section. For example, the JDF data includes information designating post-print processing such as case bookbinding, saddle stitch bookbinding, and cutting processing. The JDF parser of the postpress server 803 analyzes the processing contents and transmits the analyzed result to a finisher. The finisher A and the finisher B can execute postprocessing according to the contents instructed by the JDF.

<Arrangement of File Server>

The file server can store personal information of each end-user and various information/data relating to each received job (e.g., document/image files and print condition settings)

so that the printing system can quickly respond to a reorder of the same document if requested by an end-user.

For example, if a reprint request is entered, a worker can read the information from the file server and can quickly start the print processing with reference to the personal information and previous job settings.

The file server can store various formatted data, such as application file data, PDL data, and print-ready data (i.e., RIP processed data including bit map files and Tiff files). Furthermore, the file server can store intermediate data (e.g., display lists) not belonging to the PDL data and the print-ready data.

In general, the print-ready data has a large volume. It is useful to store the print-ready data in a separate storage medium (e.g., CD-ROM, MO, ZIP, etc.). If the PDL data is old or large in volume, it is also useful to store the PDL data in another medium. If requested by a user, the stored data can be returned together with a final output to the user.

As described above, in response to each reprint request from an end-user, the file server can read the job data of the user from the above-described storage medium and can quickly start the reprint processing.

On the other hand, a user may restore the stored data and request a reprint. For example, the order-receiving server receives a document/image file of a print job from the client PC of an end-user environment and directly stores the original document in a memory unit (not shown) of the file server for a predetermined period of time. Then, if a print job of the same document is reordered by an end-user, the reordered job can be quickly processed without requiring a document/image file transmitted from the end-user.

Furthermore, a paper document of a copy job received from an end-user is scanned and stored as a scan image file in the memory unit (not shown) of the file server. Thus, if a copy job of the same document is reordered by an end-user, the reordered job can be quickly processed without requiring a paper document transmitted from the end-user.

Furthermore, after the print job or the copy job is processed according to the output format designated by an end-user, a pre-print final document/image file edited by a worker or post-print final print data can be stored in the memory unit of the file server for a predetermined period of time. Thus, if a reorder is received from an end-user, the post-processing work can be easily performed.

<Order placement from Client>

In general, instructions sent from an orderer to the above-described printing system include no detailed settings with respect to the bookbinding processing. For example, the client designates fundamental bookbinding information (e.g., number of copies, delivery time, paper size, cover slip settings, stitching method in the bookbinding processing, one-sided/two-sided print, color profile information, etc.) and print document data, and the client requests the order-receiving server to make a rough estimation. In the present exemplary embodiment, the bookbinding information is referred to as product intent and described in a product node. The order-receiving server transmits the product intent to the MIS server.

The MIS server transmits product intent information to the prepress server, the print server, and the postpress server. The server of each process receives the product intent information and converts the product node describing the product intent into a process node indicating exemplary processing, with reference to an operating state, a resource state (e.g., paper, ink, etc.), and executable functions of a processing device executing each process.

The conversion result from a product node to a process node is variable depending on the state and capability of a JDF worker. For example, if a received product intent includes creation of an A4-size book, the A4-size book can be fabricated by bookbinding A4-size sheets (as one method) or can be fabricated by cutting or folding A3-size sheets into exact halves and then bookbinding them to obtain an A4-size book (as another method). In other words, the processing devices and a processing order are variable depending on a selected method. Therefore, various workflows can be created depending on the situation.

The workflow manager receives process nodes converted by respective process servers, and creates workflows based on such information. As described above, processing contents and a processing device are specified in a process node.

The MIS server estimates delivery time and a fee based on a created workflow and, if necessary, can present a sample of print product (i.e., a test print) to a client. The client (i.e., an orderer) can confirm the sample and authorize the order if the delivery time and the fee are acceptable. In response to the authorized order, the MIS server executes the processing of each process based on the workflow used in the estimation.

The intent nodes used in the processing and job tickets describing process nodes can be stored for reprint.

<Product Intent>

Figure 9:
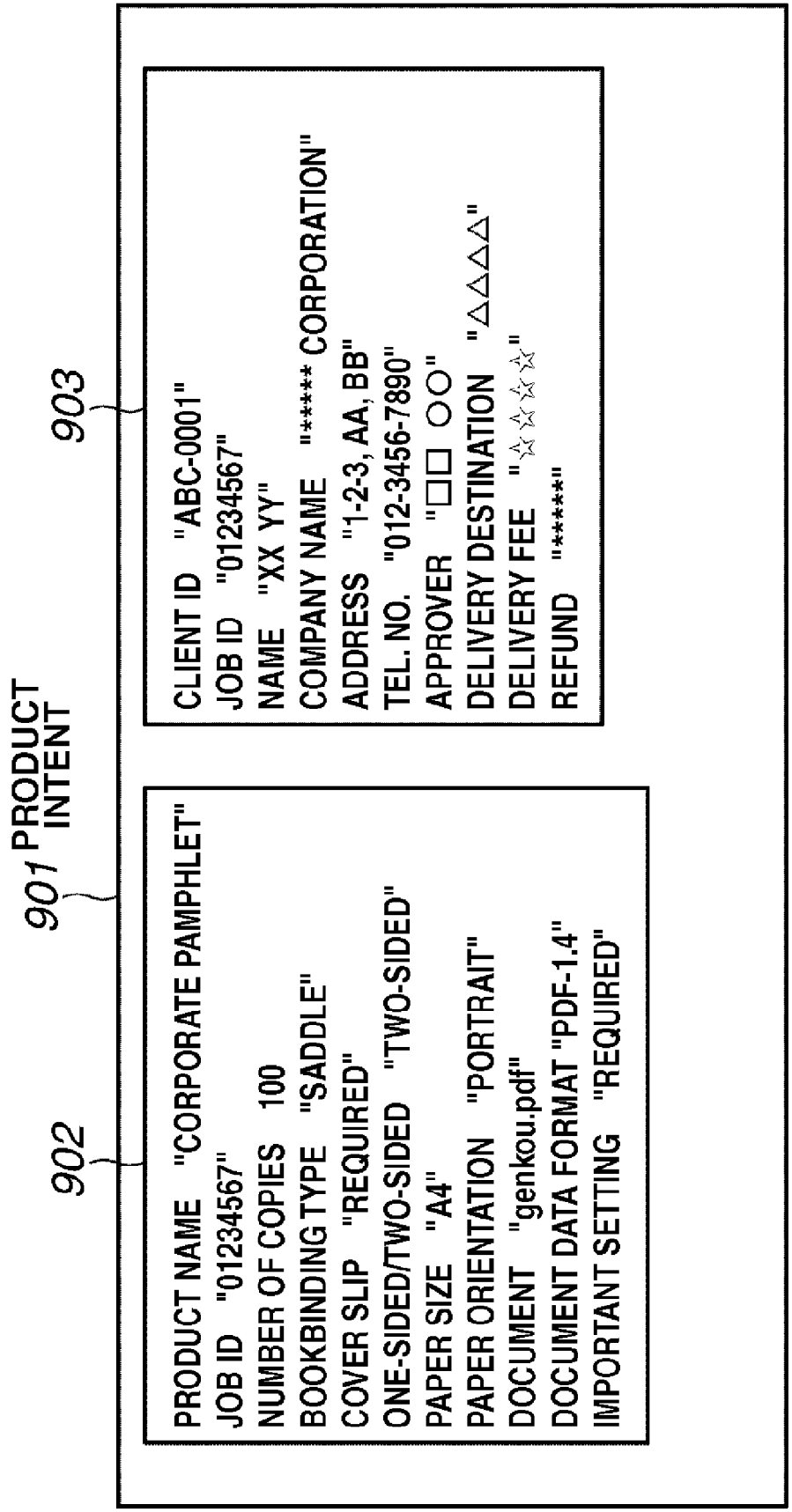
FIG. 9 illustrates an example of information described in an intent node.

FIG. 9 illustrates an example of a product intent 901 described in a job ticket. The product intent 901, for example, includes print processing information 902 and personal (orderer) information 903. The print processing information 902 includes product name, number of copies, bookbinding type, cover slip, one-sided/two-sided, paper size, paper orientation, and document data information.

The personal information 903 includes client ID, name, company name, address, telephone number, approver of order, delivery destination, and accounting information.

The information of the product intent 901 is processed in respective processes, and has no concern with respect to resources required in the works of other processes. Therefore, a process node converted in each process is added to the intent node and transmitted to the final process.

Figure 10:
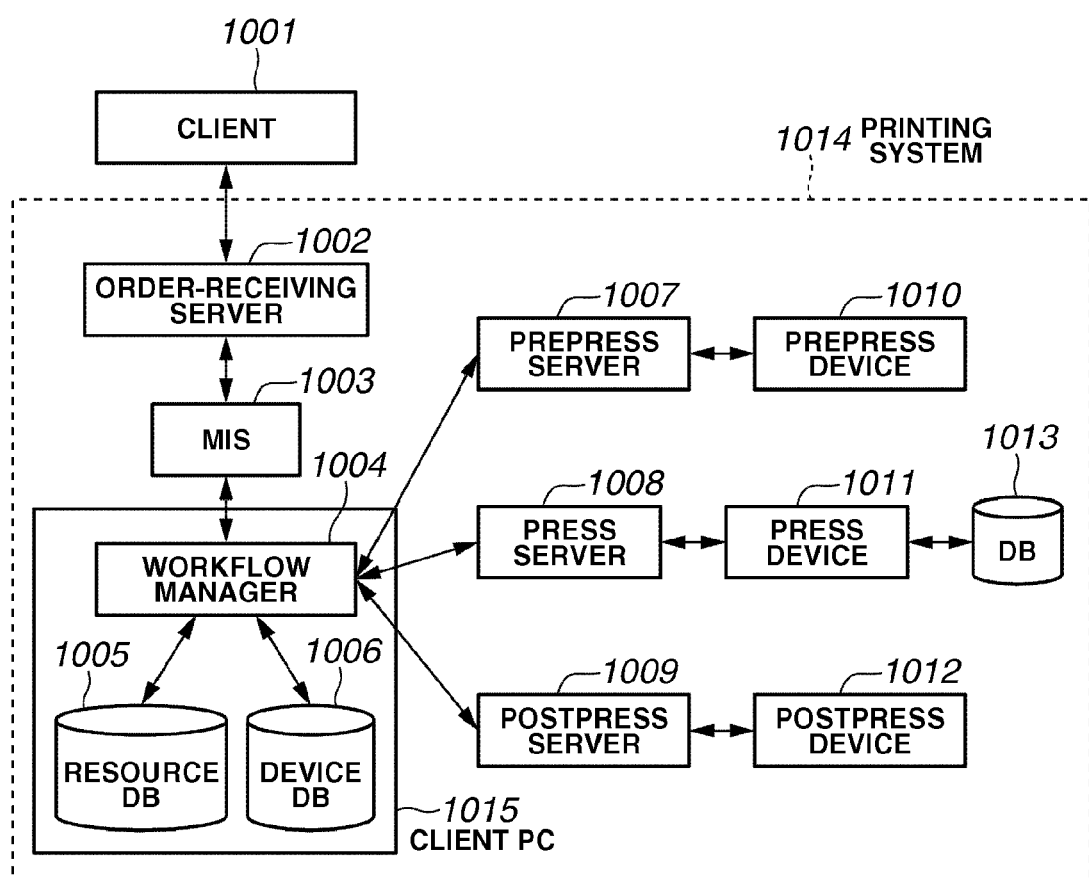
FIG. 10 is a block diagram illustrating a printing system according to an exemplary embodiment.

FIG. 10 is a block diagram illustrating a printing system according to an exemplary embodiment.

A printing system 1014 includes an order-receiving server 1002 that can receive a request from a client 1001. An MIS server 1003 can receive information from the order-receiving server 1002. More specifically, the MIS server 1003 can receive a job ticket including a product intent based on client's order information. The MIS server 1003 can transmit the job ticket including the product intent to a workflow manager 1004. The workflow manager 1004 can transmit the received job ticket including product intent information to each process server. The workflow manager 1004 can create a workflow as a combination of process nodes created by each process server to realize contents described in the product intent information.

Then, with reference to created workflows, the workflow manager 1004 can determine an appropriate workflow according to a later-described method.

A prepress server 1007 can manage a prepress device 1010 configured to realize a prepress process (i.e., pre-print processing). A press server 1008 can manage a press device 1011 configured to realize a press process (i.e., print processing). A postpress server 1009 can manage a postpress device 1012 configured to realize a postpress (i.e., post-print processing).

A device database (DB) 1006 can store device information managed by the prepress server 1007, the press server 1008, and the postpress server 1009, and can store process nodes created by respective process servers. A resource database 1005 can store content data commonly used by the processing devices and the job ticket data.

A database 1013 can store the information used in the print processing (i.e., processed document data and job ticket data) so that the stored data can be used again if a reprint is requested.

In the present exemplary embodiment, the workflow manager 1004 can be realized by any information processing apparatus in the process management section 103 (e.g., a client PC 1015 in the process management section 103 shown in FIG. 2).

<System Processing Flow>

Figure 11:
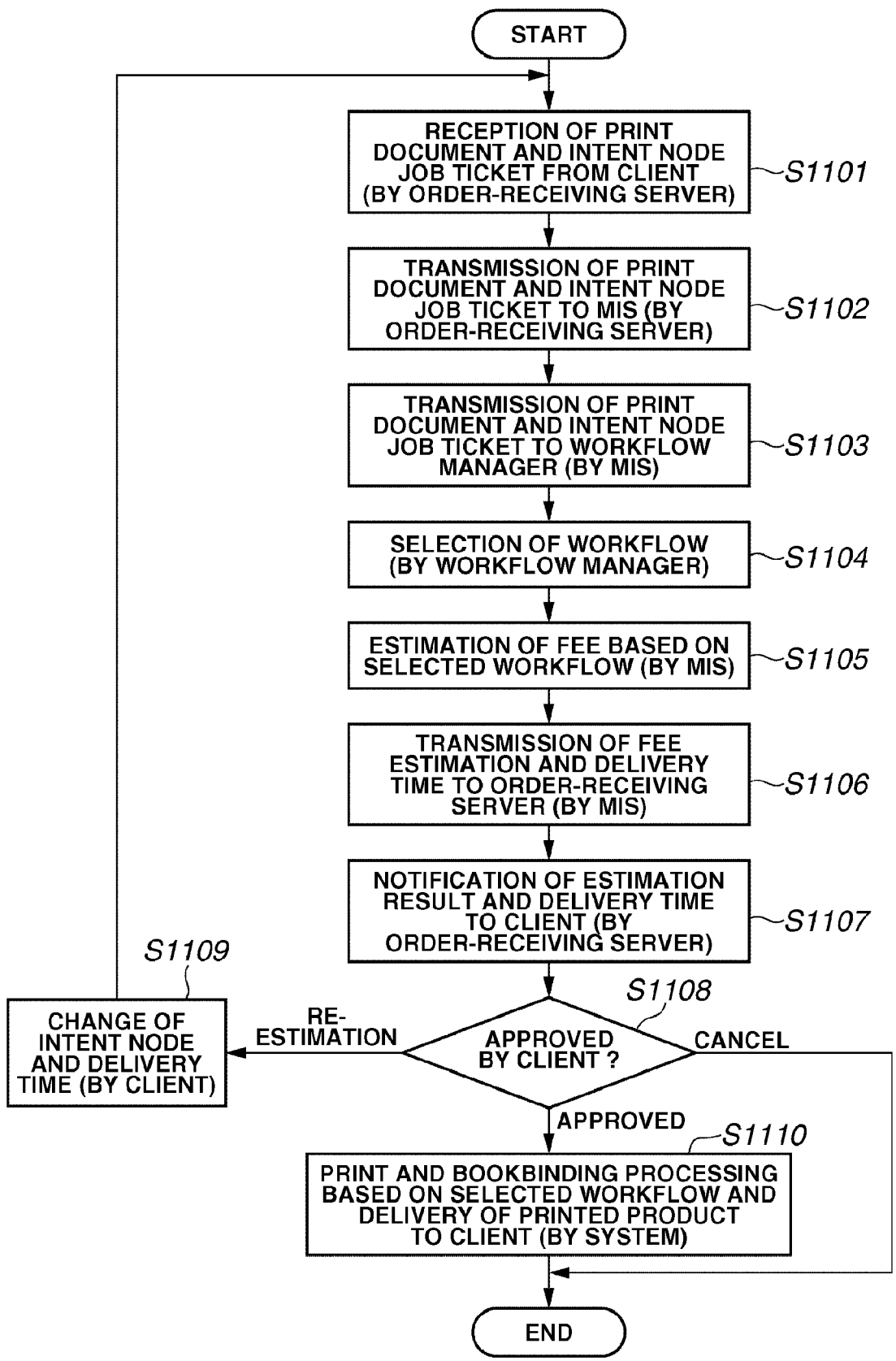
FIG. 11 is a flowchart showing overall processing performed by the printing system.

FIG. 11 is a flowchart showing overall processing of the printing system shown in FIG. 10 according to the present exemplary embodiment. Each step in the flowchart shown in FIG. 11 can be executed by a CPU of a device that executes each step.

The order-receiving server 1002 receives a print document and an intent node job ticket from the client 1001 (refer to step S1101). Then, the order-receiving server 1002 transmits the received print document and intent node job ticket to the MIS server 1003 (refer to step S1102). The order-receiving server 1002 can store the print document data, if desirable.

The MIS server 1003 transmits the print document and the intent node job ticket to the workflow manager 1004 (refer to step S1103). The workflow manager 1004 sends the intent node job ticket received from the MIS server 1003 to each process server (i.e., prepress server, press server, and postpress server).

Then, each process server creates a process node including processing satisfying conditions described in the intent node job ticket and a device capable of executing the processing, based on the received intent node job ticket. Then, the workflow manager 1004 receives the process node created by each process server and stores the received process nodes in the device DB 1006.

The workflow manager 1004 combines the process nodes received from respective process servers, and creates a workflow for realizing the contents described in the intent job ticket. For example, if the received intent node job ticket includes "five copies of an A4-size book", the workflow manager 1004 can use a workflow including a print process applied to A4-size sheets and a bookbinding process applied to the printed A4-size sheets, or a workflow including a 2 in 1 imposition applied to A3-size sheets and a cutting process applied to the A3-size printed sheets.

In this case, for example, the prepress server 1007 creates a process node including processing for imposing the received print document data in A4 size and designating a device that can execute the imposition processing. Furthermore, the prepress server 1007 creates a process node including processing for imposing, by 2 in 1, the received print document data in A3 size and designating a device that can execute the imposition processing. The prepress server 1007 sends two process nodes created in this manner to the workflow manager 1004.

The press server 1008 creates a process node including a method of printing the print document data on A3-size sheets and a device that can execute the print processing and a process node including a method of printing the print document data on A4-size sheets and a device that can execute the processing. Then, the press server 1008 sends two process nodes created in this manner to the workflow manager 1004.

The postpress server 1009 creates a process node including a method of bookbinding A4-size output products and a device that can execute bookbinding processing, and sends the created process node to the workflow manager 1004.

Furthermore, the postpress server 1009 creates a process node including a method of cutting A3-size sheets into A4-size sheets and bookbinding the A4-size output products and also including a device that can execute bookbinding processing. The postpress server 1009 sends the created process node to the workflow manager 1004.

The workflow manager 1004 combines the process nodes obtained from respective processing devices and creates a workflow for creating "five copies of an A4-size book." According to the above-described example, the workflow manager 1004 creates a workflow as a combination of a process node for imposing the print document data in A4 size, a process node for printing the print document data on A4-size sheets, and a process node for bookbinding A4-size output products.

Furthermore, the workflow manager 1004 creates a workflow as a combination of a process node for imposing, by 2 in 1, the print document data in A3 size, a process node for printing document image data on A3-size sheets, and a process node for cutting A3-size output products and bookbinding A4-size output products.

In short, the workflow manager 1004 selects process nodes required for processing the contents described in the intent node job ticket, and combines the selected process nodes to create a workflow.

As described above, the workflow manager 1004 combines the process nodes received from respective process servers and creates a workflow capable of obtaining an output product corresponding to a client's order described in the intent node job ticket received from the MIS server 1003.

In the present exemplary embodiment, the 2 in 1 imposition is referred to as processing for imposing two logical pages (i.e., print data) on one physical page (i.e., a recording medium). In other words, the N in 1 imposition is referred to as processing for imposing N logical pages on a piece of physical page.

The workflow manager 1004 selects an appropriate workflow according to later-described processing (refer to step S1104). The workflow manager 1004 sends the selected workflow to the MIS server 1003. Then, the MIS server 1003 calculates a fee (estimation result) required for processing the selected workflow (refer to step S1105).

More specifically, the MIS server 1003 determines resources to be used according to the workflow. For example, according to the above-described examples, the type of sheets and a total number of the sheets are variable depending on the selected workflow (i.e., cutting A3-size sheets into A4-size sheets or using A4-size sheets). Thus, the cost is dependent on the selected workflow. Furthermore, the MIS server 1003 calculates a delivery time based on the workflow.

The MIS server 1003 transmits the calculated cost and the delivery time to the order-receiving server 1002 (refer to step S1106). The order-receiving server 1002 sends the estimation result and the delivery time to the client 1001 (refer to step S1107). The client 1001 displays the notified estimation result and the delivery time on the CRT display to enable an operator to approve or deny the presented estimation and the delivery time (refer to step S1108).

If the client 1001 instructs re-estimation in step S1108, the client 1001 changes the delivery time in the intent node (refer to step S1109). The processing flow then proceeds to step S1101. If the client 1001 approves the presented estimation result and the delivery time in step S1108, the workflow manager 1004 executes the processing according to the selected workflow and delivers the output result to the client

1001 (refer to step S1110). If the client cancels the processing in step S1108, the workflow manager 1004 terminates the processing of FIG. 11.

As described above, FIG. 11 shows the processing performed by an information processing apparatus configured to create a processing route defining a processing order of plural processes to process output information including output setting information and print data.

In the present exemplary embodiment, the output setting information is a job ticket (including the intent node job ticket shown in FIG. 9) which is required to obtain a final output product. Furthermore, the output information is required to create the output result. Furthermore, the workflow manager 1004 selects a device that can process the print data according to the output setting information. Then, the workflow manager 1004 combines the devices performing the processing of selected processing processes and creates a processing route for processing the print data.

Furthermore, the workflow manager 1004 determines a security level of the created processing route according to a predetermined condition and determines a processing route for processing the print data according to the determined security level (refer to step S1104). In the present exemplary embodiment, the processing route defining a processing order of plural processing processes is equivalent to a workflow created for processing the print data.

<Workflow Selection Processing>

Figure 12:
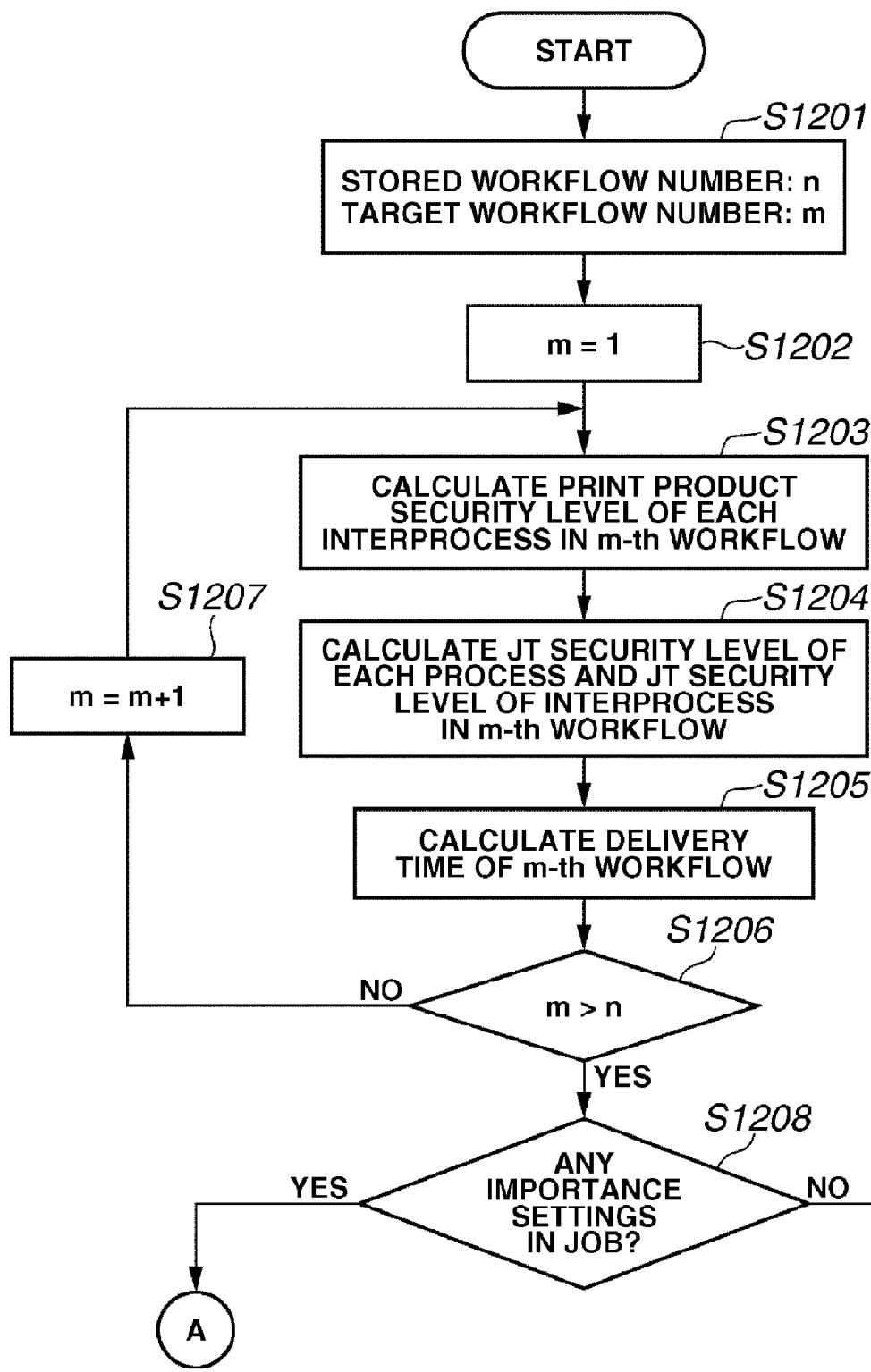
FIG. 12 is a flowchart showing exemplary security level calculation processing performed by a workflow manager.

FIG. 12 is a flowchart showing details of step S1104 in FIG. 11 in which the workflow manager 1004 in the printing system 1014 selects a workflow based on the security level of a print product (i.e., output result) and the security level of a job ticket. Each step in the flowcharts shown in FIGS. 12 to 14 can be executed by a CPU of the information processing apparatus containing the workflow manager 1004.

The workflow manager 1004 reads, from a storage section (e.g., RAM 3402), workflows created by combining process nodes received from the process servers. Then, the workflow manager 1004 stores a number "n" of readout workflows and designates a target workflow "m" whose security level the workflow manager 1004 calculates (refer to step S1201).

The work flow manager 1004 initializes m (refer to step S1202), and calculates a print product security level from an m-th workflow (refer to step S1203). More specifically, the workflow manager 1004 recognizes devices that process respective processes of the target workflow, based on information described in the process nodes obtained from the above-described process servers.

Figure 31:
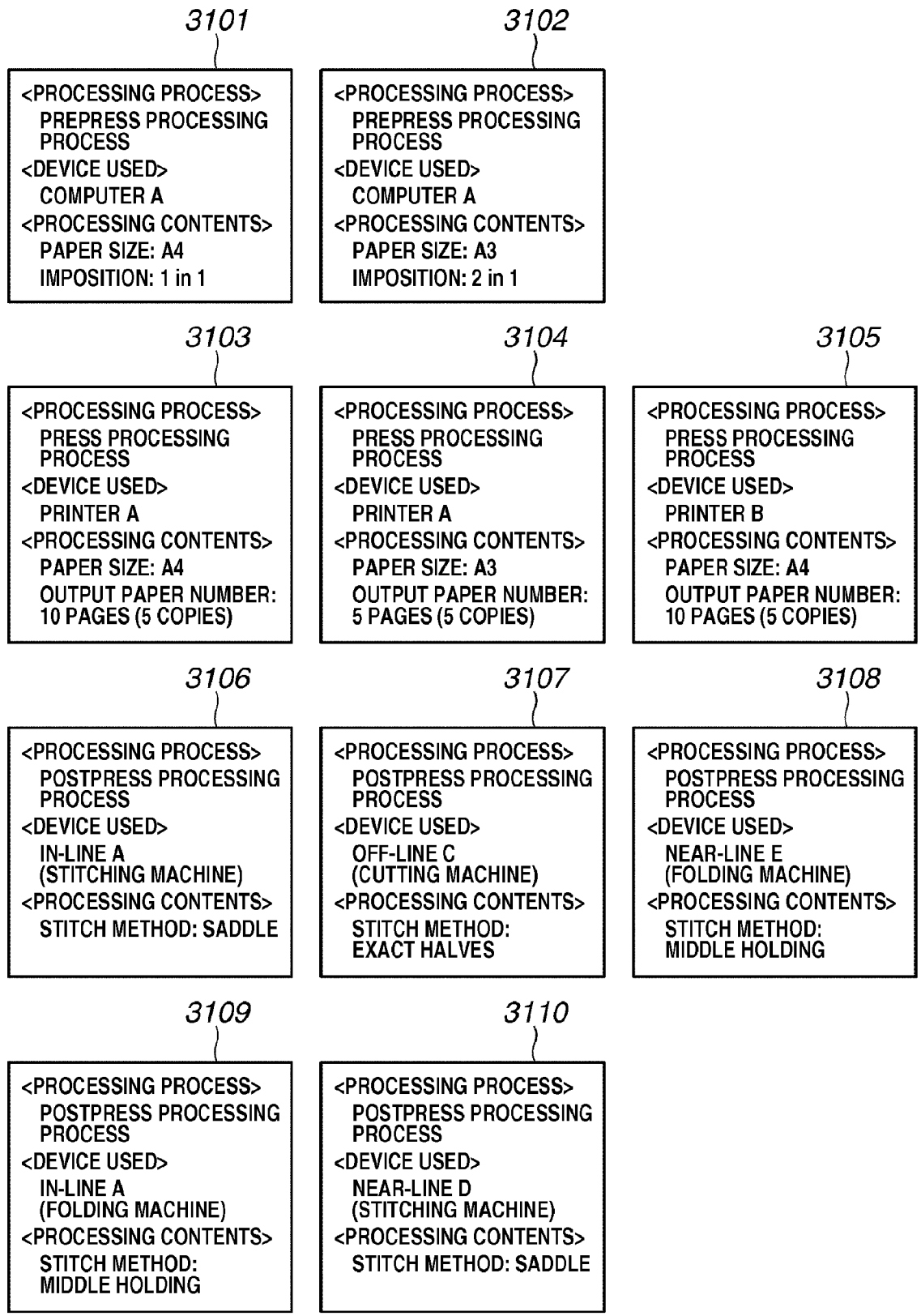
FIG. 31 illustrates exemplary process node job tickets.

FIG. 31 shows examples of the process node. The process node describes a device to be used and processing to be executed. Subsequently, the workflow manager 1004 calculates a security level of each interprocess with reference to a print product security level table 1501 shown in FIG. 15. For example, if the present target workflow includes a process node 3103 and a process node 3110, the workflow manager 1004 can determine the interprocess security level as "2" based on the print product security level table 1501 shown in FIG. 15.

In this manner, the workflow manager 1004 calculates a print product security level of each interprocess and stores the calculated security level information. In the present exemplary embodiment, a secure interprocess has a higher security level. Detailed processing of step S1203 will be described later with reference to the flowchart of FIG. 22.

More specifically, the workflow manager 1004 calculates an index value showing that an interprocess for transferring an output result of a device executing the processing of a target processing process to a device executing a next processing process via a physically connected conveyance path is secure compared to another interprocess for transferring an output result of a device executing the processing of a target processing process to a device executing a next processing process via a physically disconnected conveyance path.

Subsequently, the workflow manager 1004 calculates a job ticket security level of each process and a job ticket security level of each interprocess in the m-th workflow (refer to step S1204). More specifically, each processing device executes the processing based on the contents described in a received job ticket. The job ticket is stored in a storage section of each device.

A first job ticket security level table shown in FIG. 16 can manage job ticket security levels with reference to the storage processing. For example, if a device can encrypt a job ticket in the storage processing, a higher security level is set for the device. On the other hand, if a device cannot encrypt a job ticket in the storage processing, a lower security level is set for the device.

Accordingly, the workflow manager 1004 can calculate a job ticket security level of each process with reference to the first job ticket security level table shown in FIG. 16. Furthermore, the workflow manager 1004 can calculate a job ticket security level of each interprocess with reference to a second job ticket security level table shown in FIG. 17.

The second job ticket security level table shown in FIG. 17 is similar to the print product security level table shown in FIG. 15. Details of step S1204 will be later described with reference to the flowchart of FIG. 23. In this manner, the workflow manager 1004 can calculate job ticket security levels with reference to the tables shown in FIGS. 16 and 17.

Then, the workflow manager 1004 calculates a delivery time of the present target workflow (refer to step S1205). Details of step S1205 will be later described with reference to the flowchart of FIG. 32.

Then, the workflow manager 1004 determines whether the processing of steps S1203 through S1205 has been performed for all workflows stored in the device DB 1006 (refer to step S1206). If the processing of steps S1203 through S1205 has not yet been performed for all workflows stored in the device DB 1006 (i.e., NO in step S1206), the workflow manager 1004 processes the next workflow (refer to step S1207).

When the processing of steps S1203 through S1205 has been performed for all workflows stored in the device DB 1006 (i.e., YES in step S1206), the workflow manager 1004 determines whether the processing target job includes any importance settings with reference to the intent node obtained from the MIS server 1003 (refer to step S1208).

Figure 13:
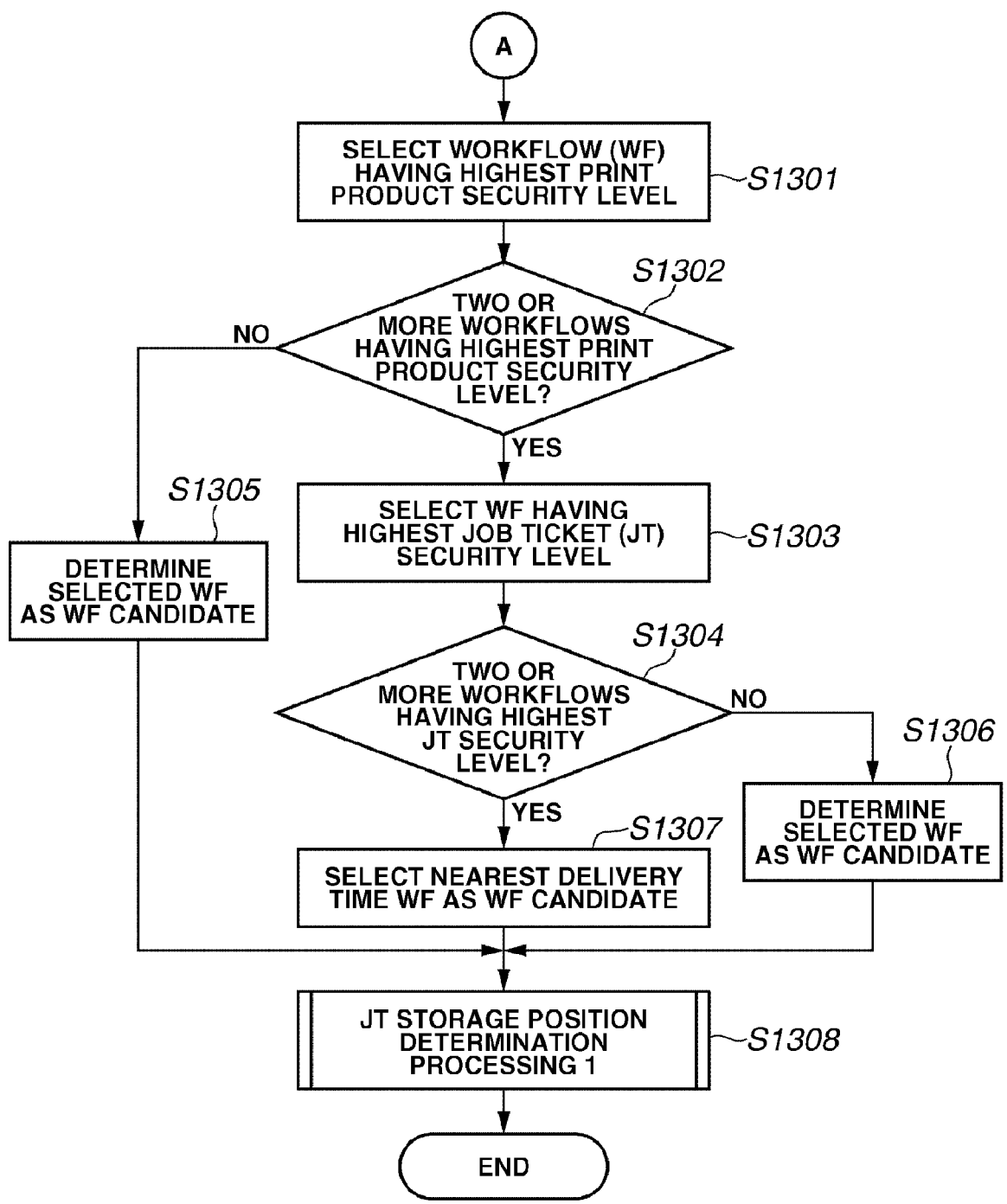
FIG. 13 is a flowchart showing exemplary workflow selection processing.

If the processing target job includes any importance settings (i.e., YES in step S1208), the processing flow proceeds to the flowchart of FIG. 13. Otherwise, the processing flow proceeds to the flowchart of FIG. 14.

The workflow manager 1004 executes the processing of FIG. 13 to select a security-oriented workflow.

First, the workflow manager 1004 selects a workflow that can handle a print product most securely based on the print product security level calculated in the processing of step S1203 (refer to step S1301). More specifically, the workflow manager 1004 can realize the processing of step S1301 with reference to the values calculated in the processing of steps S1203 through S1205 which can be stored in the format shown in FIG. 19.

If only one work flow is found (i.e., NO in step S1302), the workflow manager 1004 determines the workflow selected in step S1301 as a workflow candidate (refer to step S1305). Then, the processing flow proceeds to step S1308. When two or more securest workflows are found (i.e., YES in step S1302), the workflow manager 1004 selects a workflow that can handle a job ticket most securely among the plural workflows selected (refer to step S1303). The processing of step S1303 is basically similar to the processing of step S1301. The job ticket security levels can be stored in the format shown in FIG. 21.

If only one workflow can be specified (i.e., NO in step S1304), the workflow manager 1004 determines the workflow selected in step S1303 as a workflow candidate (refer to step S1306). Then, the processing flow proceeds to step S1308.

When the determination result is YES in step S1304, the workflow manager 1004 selects a workflow having a shortest delivery time among the plural workflows that can most securely handle the print product and the job ticket. The workflow manager 1004 determines the selected workflow as a workflow candidate (refer to step S1307).

After the workflow candidate is determined in step S1305, S1306, or S1307, the workflow manager 1004 executes job ticket storage position determination processing 1 (refer to step S1308). Details of step S1308 will be described later.

Figure 22:
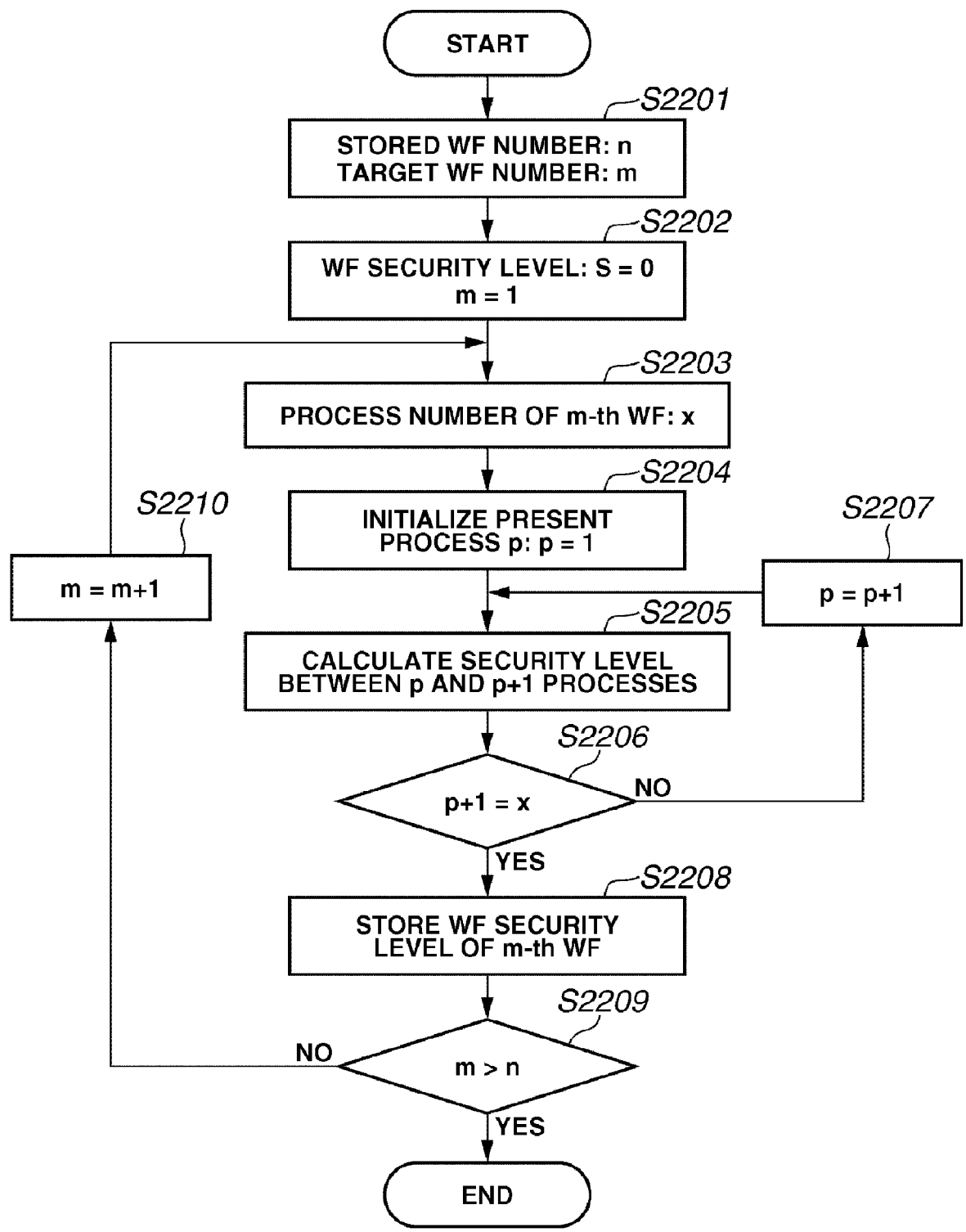
FIG. 22 is a flowchart showing exemplary print product security level calculation processing.
Figure 23:
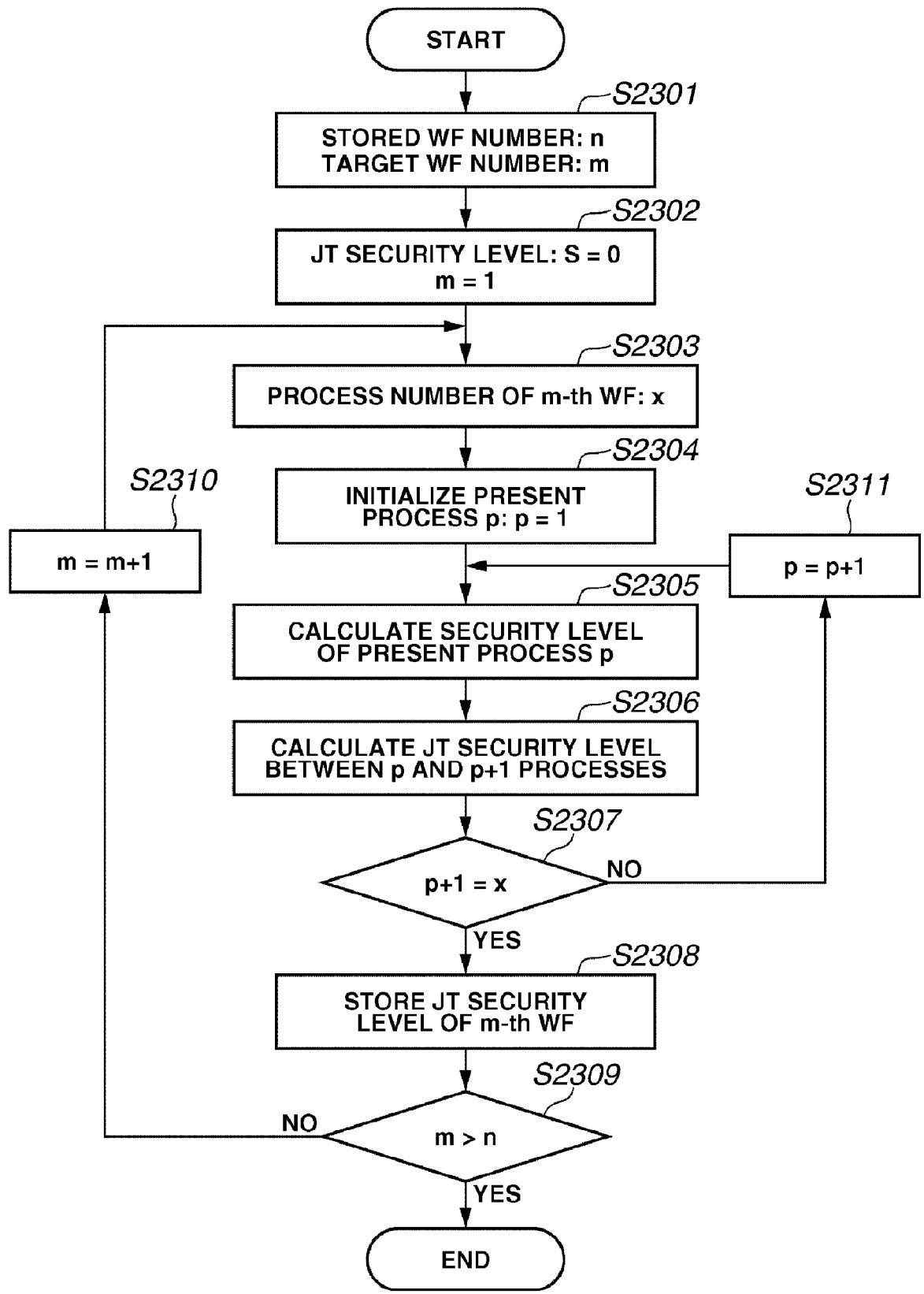
FIG. 23 is a flowchart showing exemplary job ticket security level calculation processing.

The workflow manager 1004 executes the processing of steps S1302 through S1304, and determines a processing route of print data based on a security level of the processing route determined through the processing of FIG. 22 and a job ticket security level of the processing route calculated through the processing of FIG. 23.

Figure 32:
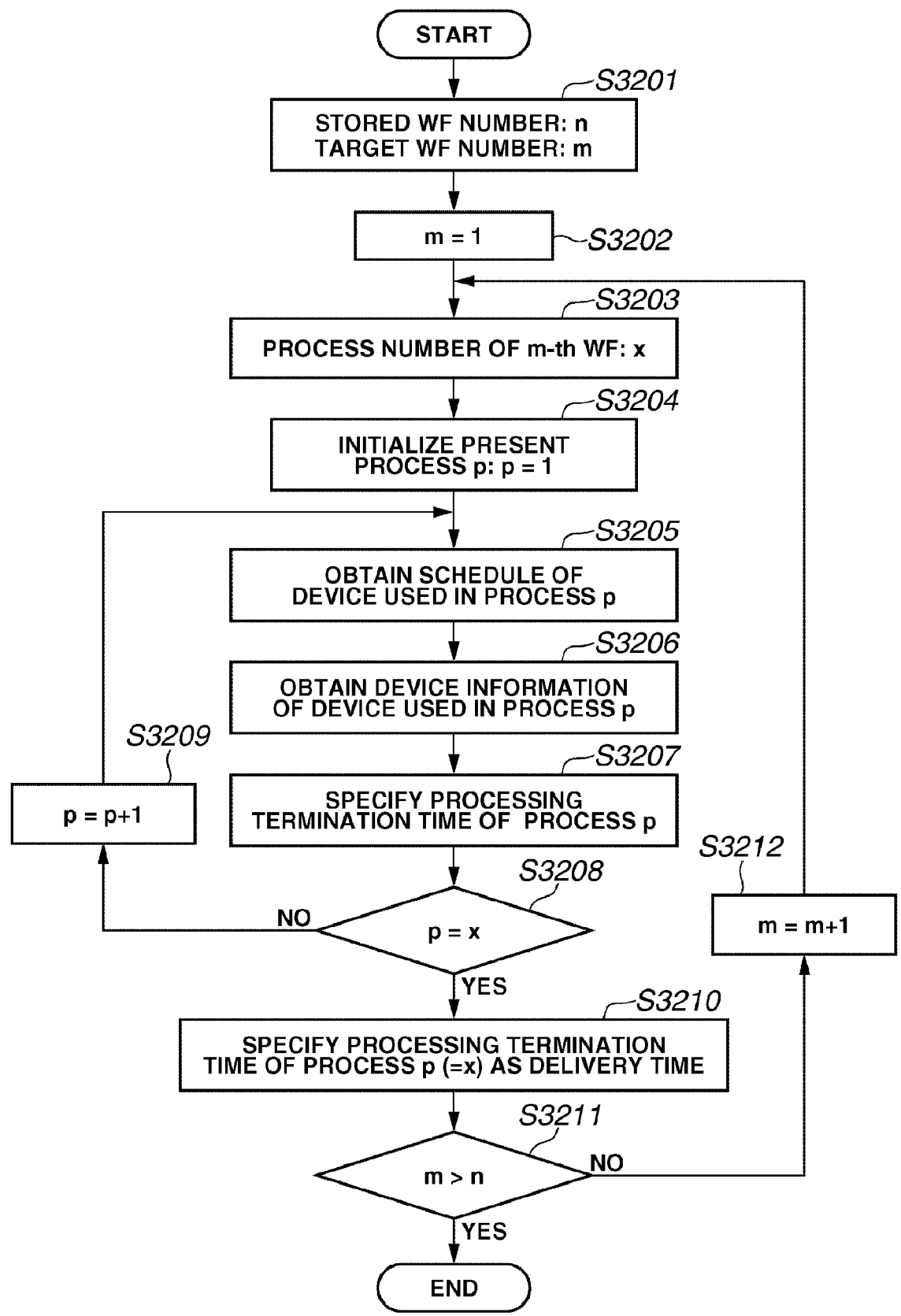
FIG. 32 is a flowchart showing exemplary delivery time calculation processing.

Alternatively, the workflow manager 1004 can determine a processing route of print data based on the processing route security level determined through the processing of FIG. 22, the job ticket security level of the processing route calculated through the processing of FIG. 23, and the delivery time information obtained through the processing of FIG. 32.

Figure 14:
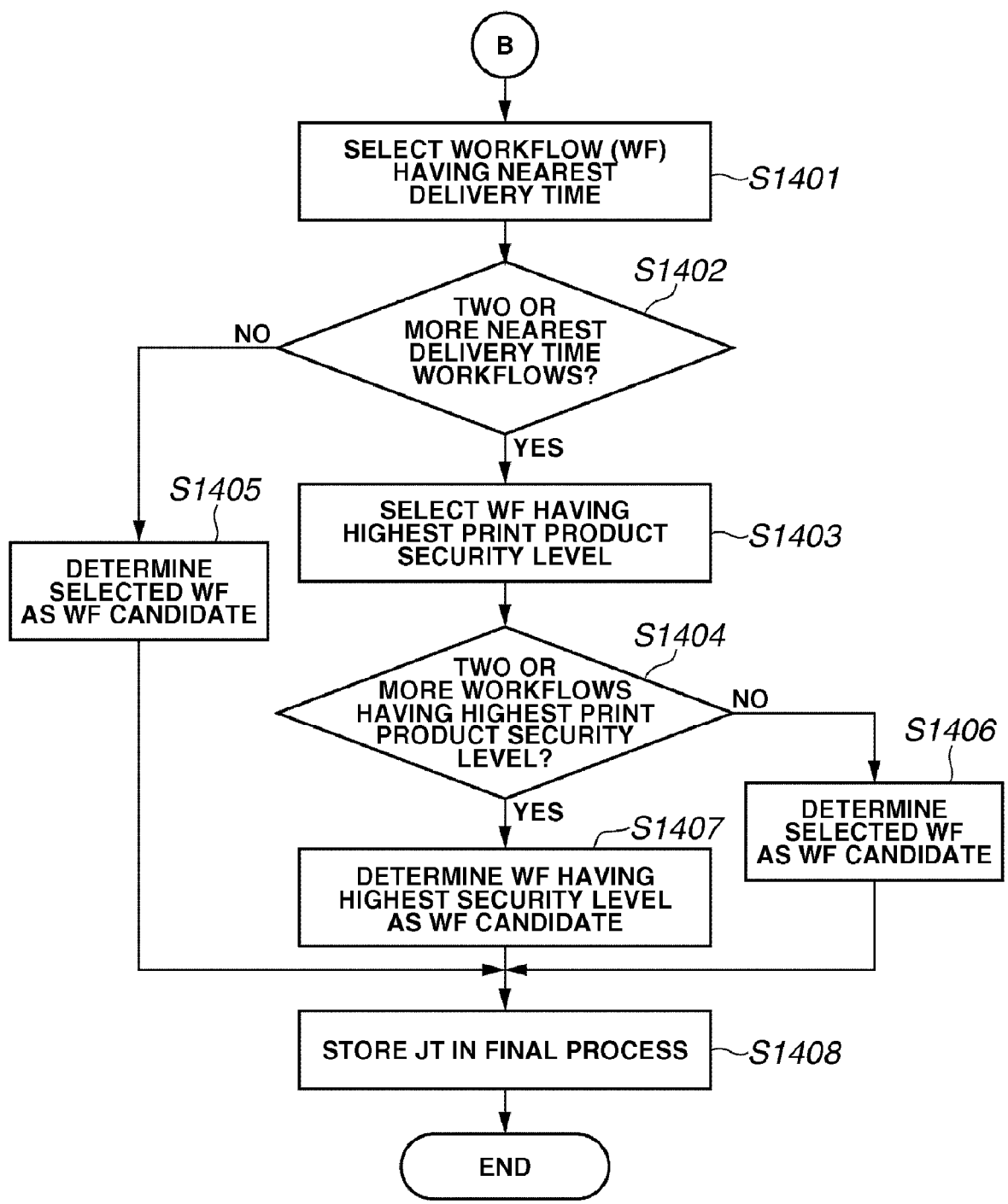
FIG. 14 is a flowchart showing exemplary workflow selection processing.

Next, the flowchart shown in FIG. 14 will be described.

The workflow manager 1004 selects a workflow having a nearest delivery time based on the result obtained in the processing of step S1205 (refer to step S1401). More specifically, the workflow manager 1004 selects a workflow having a nearest delivery time based on the information shown in FIG. 19.

If only one workflow is found (i.e., NO in step S1402), the workflow manager 1004 determines the workflow selected in step S1401 as a workflow candidate (refer to step S1405). Then, the processing flow proceeds to step S1408. When two or more workflows have the nearest delivery time (i.e., YES in step S1402), the workflow manager 1004 selects a workflow that can most securely handle a print product among plural workflows selected (refer to step S1403). The processing of step S1403 is similar to the processing of step S1301 and will not be described below in detail.

If only one workflow can be specified (i.e., NO in step S1404), the workflow manager 1004 determines the workflow selected in step S1403 as a workflow candidate (refer to step S1406). Then, the processing flow proceeds to step S1408.

When the determination result is YES in step S1404, the workflow manager 1004 selects a workflow having a highest job ticket security level among the plural workflows that have the nearest delivery time and can handle the print product securely. The workflow manager 1004 determines the selected workflow as a workflow candidate (refer to step S1407).

After the workflow candidate is determined in step S1405, S1406, or S1407, the workflow manager 1004 stores the job ticket of the selected workflow in a final process that can store the job ticket (refer to step S1408).

FIG. 18 shows an example resulting from the processing performed in step S1203 of FIG. 12. For example, it is now assumed that a printer A is a print processing device designed for A4- and A3-size sheets and a printer B is a print processing device designed for only A3-size sheets. Each of the printer A and the printer B includes a saddle stitching machine (i.e., in-line finisher) and a folding machine (i.e., in-line finisher). Furthermore, devices performing post-print processing processes include an off-line cutting machine, a near-line stitching machine, and a near-line folding machine.

In the above-described environment, the workflow manager 1004 creates a workflow that can realize the contents described in the intent node shown in FIG. 9. Accordingly, various workflows can be created depending on the environment. For example, in the above-described environment, five different workflows can be created as shown in FIG. 19.

The print product security level of each interprocess in each created workflow can be calculated based on the table shown in FIG. 15 and can be stored as shown in FIG. 18. By creating the table shown in FIG. 19 based on the result, it is possible to determine a workflow that can handle a print product most securely. The method for calculating security levels shown in FIG. 19 will be described later with reference to the flowchart of FIG. 22.

FIG. 18 shows a security level in each transfer of a print product from an upstream processing device (i.e., a source device) to a downstream processing device (i.e., a destination device). If the upstream and downstream processing devices are discontinuous, the security level is indicated as "unconnectable." For example, in the printing system 1014, a workflow can be created to define a processing order of cutting process, stitching process, and folding process. Accordingly, in FIG. 18, a transfer from the near-line D (stitching machine) to the off-line C (cutting machine) is unconnectable because these processing devices are discontinuous.

Furthermore, in the printing system 1014, it is not allowed to use in-line finishers of different devices. Therefore, the printer B cannot use an in-line finisher of the printer A (i.e., unconnectable). The above-described definition is a mere example. The printing system of the present exemplary embodiment is not limited to the above-described definition.

FIG. 20 shows an example resulting from the processing performed in step S1204 of FIG. 12. The calculation of job ticket security levels shown in FIG. 20 is basically similar to the calculation of security levels shown in FIG. 18, although the processing of step S1204 also obtains a security level of each process because the security level varies depending on whether or not a storage section can store encrypted job tickets.

In the present exemplary embodiment, storage sections of the printer B, the off-line finisher C, the near-line finisher D, and the near-line finisher E can store encrypted job tickets. On the other hand, storage sections of other devices cannot store encrypted job tickets. The environment of FIG. 20 is similar to the environment of FIG. 18, and accordingly a total of five workflows can be obtained as shown in FIG. 19.

Based on the above-described information, the workflow manager 1004 calculates a security level of the job ticket and obtains the result shown in FIG. 21. The calculation method of a job ticket security level will be described later with reference to FIG. 23.

Accordingly, the workflow manager 1004 can specify a workflow that can securely handle a print product and a job ticket with reference to the tables of FIGS. 19 and 21.

In the calculation of job ticket security levels, it is useful to take the job ticket transfer method into consideration. For example, a job ticket can be transmitted using a hot folder, or using a mail of MIME (multipurpose internet mail extension) encoded data. Furthermore, the setting values can be converted into a bar code and attached to an intermediate print product to transmit a job ticket. Thus, defining a security level varying depending on a transmission method is useful to determine a workflow capable of securely handling a job ticket.

<Print Product Security Level Calculation Processing Flow>

FIG. 22 is a flowchart showing details of the processing performed by the workflow manager 1004 in step S1203 of FIG. 12. Each step in the flowchart of FIG. 22 and succeeding flowcharts can be executed by a CPU of an information processing apparatus that can store the workflow manager 1004.

The workflow manager 1004 creates a workflow that can realize the contents described in the intent node based on the process nodes received from respective process servers. The workflow manager 1004 can create two or more workflows. In addition, the workflow manager 1004 has a pointer capable of recording a security level of the present process.

The workflow manager 1004 identifies a total number "n" of the workflows presently stored and designates a target workflow "m" for the print product security level calculation (refer to step S2201). First, the workflow manager 1004 sets a workflow security level as S=0. In the present exemplary embodiment, a higher value indicates a higher security level. Accordingly, the security level S=0 is the lowest security level.

The workflow manager 1004 initializes "m" (i.e., m=1) to start calculation processing of a first workflow (refer to step S2202). Furthermore, the workflow manager 1004 recognizes a total number "x" of processes included in the m-th workflow (refer to step S2203). The created workflow can be stored in the device DB 1016.

Then, the workflow manager 1004 initializes the present process p (i.e., p=1) to start calculation of a security level of a first interprocess in the m-th workflow (refer to step S2204).

Subsequently, the workflow manager 1004 calculates a security level between the p-th process and the p+1-th process (refer to step S2205). More specifically, the workflow manager 1004 recognizes a device that can perform the processing of p+1-th process, and calculates a security level between the p-th process and the p+1-th process based on the table of FIG. 15. For example, if a device performing the processing of the p+1-th process is a near-line type, the workflow manager 1004 determines the security level as "2" with reference to the table of FIG. 15. The workflow manager 1004 temporarily stores the value calculated in step S2205.

Then, the workflow manager 1004 determines whether the p+1-th process is a final process in the m-th workflow (refer to step S2206). The workflow manager 1004 repeats the processing of step S2205 until the p+1-th process becomes the final process in the m-th workflow (refer to step S2207).

The workflow manager 1004 stores security levels of all interprocesses calculated in step S2205. Accordingly, when the p+1-th process is the final process (i.e., YES in step S2206), the workflow manager 1004 compares the security levels of all interprocesses in the present target workflow and stores a minimum value as a security level of the m-th workflow (refer to step S2208). In other words, the workflow manager 1004 compares the calculated security levels of plural interprocesses included in the target processing route and determines, as a security level of the target processing route, a security level of an interprocess that cannot be securely processed compared to other interprocesses. As a result of the processing performed in step S2208, the security level of each workflow can be stored in the format shown in FIG. 19.

Then, the workflow manager 1004 determines whether calculation of security levels of all workflows is accomplished (refer to step S2209). When the calculation of security levels of all workflows has been finished (i.e., YES in step S2209), the workflow manager 1004 terminates the processing routine shown in FIG. 22. If the calculation is not yet finished (i.e., NO in step S2209), the workflow manager 1004 starts the processing of a succeeding workflow (refer to step S2210).

Through the processing shown in FIG. 22, the workflow manager 1004 can evaluate security levels of plural workflows with reference to a value of an interprocess having the lowest security level in each workflow. In short, if any interprocess having a lower security level is involved in a workflow, the workflow manager 1004 cannot recognize it as a secure workflow. Thus, the workflow manager 1004 can select a reliable (i.e., sufficient secure) workflow for the succeeding processing.

Through the above-described processing, the workflow manager 1004 can create plural kinds of processing routes and determine the security level of each processing route. The security level can be calculated according to a predetermined condition. For example, the predetermined condition is the information and data described in FIGS. 15 to 17 which can be used to calculate the security level. Then, based on the determined security levels, the workflow manager 1004 determines, as a processing route for processing print data, a processing route that can process the print data securely compared to other processing routes.

<Job Ticket Security Level Calculation Processing Flow>

FIG. 23 is a flowchart showing details of the job ticket security level calculation processing performed by the workflow manager 1004 in step S1204 of FIG. 12. The workflow manager 1004 calculates a job ticket security level for executing the processing of steps S2305 and S2306.

The workflow manager 1004 identifies a total number "n" of the workflows presently stored and designates a target workflow "m" for the security level calculation (refer to step S2301). First, the workflow manager 1004 sets a job ticket security level of the workflow as S=0. In the present exemplary embodiment, a higher value indicates a higher security level. Accordingly, the security level S=0 is the lowest security level.

The workflow manager 1004 initializes "m" (i.e., m=1) to start calculation processing of a first workflow (refer to step S2302). Furthermore, the workflow manager 1004 recognizes a total number "x" of processes included in the m-th workflow (refer to step S2303).

Then, the workflow manager 1004 initializes the present process p (i.e., p=1) to start calculation of a security level of a first process in the m-th workflow (refer to step S2304).

Subsequently, the workflow manager 1004 calculates a job ticket security level of the p-th process (refer to step S2305). Namely, the workflow manager 1004 calculates a security level in the process that the device of each processing process stores the job ticket. More specifically, the workflow manager 1004 determines a storage format of the job ticket with reference to information of a device that executes the processing of the p-th process.

Then, the workflow manager 1004 calculates a job ticket security level of the p-th process with reference to the determined storage format and the table of FIG. 16. The workflow manager 1004 calculates a security level as an index showing that a device capable of storing an encrypted job ticket is secure compared to a device incapable of storing an encrypted job ticket.

Subsequently, the workflow manager 1004 calculates a job ticket security level between the p-th process and the p+1-th process (refer to step S2306). More specifically, based on information of processing devices of respective processing processes in the created processing route, the workflow manager 1004 calculates a security level in the transfer of the job ticket describing processing parameters of each processing process to the next processing process according to a processing route. The processing of step S2306 is similar to the processing of step S2205 shown in FIG. 22 and will not be described below in detail.

Then, the workflow manager 1004 determines whether the p+1-th process is a final process in the m-th workflow (refer to step S2307). The workflow manager 1004 repeats the processing of step S2305 and S2306 until the p+1-th process becomes the final process in the m-th workflow (refer to step S2311).

The workflow manager 1004 stores job ticket security levels of all processes and interprocesses calculated in steps S2305 and S2306. Accordingly, when the p+1-th process is the final process (i.e., YES in step S2307), the workflow manager 1004 compares the security levels in the present target workflow and stores a minimum value as a job ticket security level of the m-th workflow (refer to step S2308). As a result of the processing performed in step S2308, the job ticket security level of each workflow can be stored in the format shown in FIG. 21.

Then, the workflow manager 1004 determines whether calculation of job ticket security levels of all workflows is accomplished (refer to step S2309). When the calculation of security levels of all workflows has been finished (i.e., YES in step S2309), the workflow manager 1004 terminates the processing routine shown in FIG. 23. If the calculation is not yet finished (i.e., NO in step S2309), the workflow manager 1004 starts the processing of a succeeding workflow (refer to step S2310).

Through the processing shown in FIG. 23, the workflow manager 1004 can evaluate security levels of plural workflows with reference to a value of a process (or interprocess) having the lowest security level in each workflow. In short, if any process (or interprocess) having a lower security level is involved in a workflow, the workflow manager 1004 cannot recognize it as a secure workflow. Thus, the workflow manager 1004 can select a reliable (i.e., sufficiently secure) workflow for the succeeding processing.

<Job Importance Calculation Processing Flow>

Figure 24:
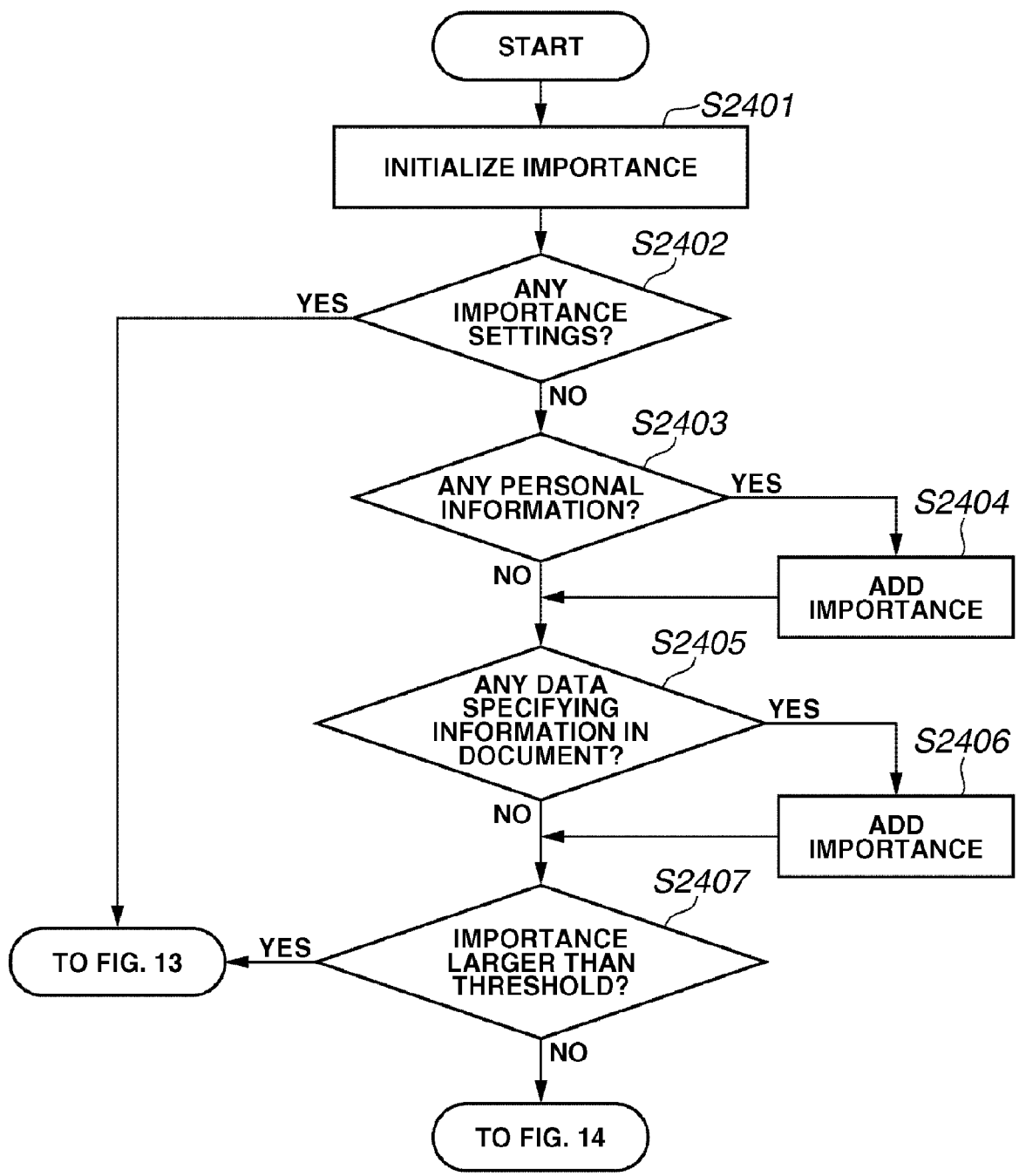
FIG. 24 is a flowchart showing exemplary importance addition processing.

FIG. 24 is a flowchart showing details of the determination processing performed in step S1208 of FIG. 12.

The workflow manager 1004 initializes job importance (refer to step S2401).

Then, the workflow manager 1004 determines whether the intent node received from the client includes any importance settings (refer to step S2402). If the intent node includes any importance settings (i.e., YES in step S2402), the workflow manager 1004 executes the processing routine shown in FIG. 13.

On the other hand, when the intent node includes no importance settings (i.e., NO in step S2402), the workflow manager 1004 determines whether the intent node job ticket shown in FIG. 9 includes any personal information (refer to step S2403). More specifically, the workflow manager 1004 stores a table 2501 shown in FIG. 25. Accordingly, if the intent node job ticket includes information agreeing with the table 2501 of FIG. 25, the workflow manager 1004 determines that the personal information is present and adds a predetermined value to the importance.

For example, three items of "address", "telephone number", and "name" are agreed between the intent node of FIG. 9 and the table 2501 of FIG. 25. Thus, the workflow manager 1004 sets the importance equal to "10" (refer to step S2404). If many personal items are described in the intent node job ticket shown in FIG. 9, the information may partly leak out of the job ticket. Thus, executing the processing of step S2404 is useful to reduce or eliminate the leakage of personal information. The table 2501 stores exemplary values for respective personal items differentiated according to their importance. The workflow manager 1004 can execute the addition processing based on the setting values shown in FIG. 25.

Then, the workflow manager 1004 determines whether information specifying a storage position of the document data is involved in the document to be printed (refer to step S2405) When the information specifying a storage position of the document data is present (i.e., YES in step S2405), the workflow manager 1004 adds a predetermined value to the importance (refer to step S2406). Namely, if the intent node job ticket includes information specifying the data of a print object, a third person may abuse or steal the print document data based on the information. Accordingly, adding the importance in the processing of step S2405 is useful to execute the processing with a workflow having higher confidentiality.

Then, the workflow manager 1004 determines whether the present importance is higher than a predetermined threshold (refer to step S2407). If the present importance is higher than the threshold (i.e., YES in step S2407), the workflow manager 1004 decides that the present job is important regardless of the importance settings in the intent node job ticket. Thus, the processing flow proceeds to FIG. 13.

As described above, the workflow manager 1004 calculates the job importance not only based on the importance settings but also based on the contents described in the intent node job ticket. Thus, the workflow manager 1004 can execute the workflow processing while maintaining higher confidentiality.

However, a user may not request importance settings. Accordingly, it is useful that the workflow manager 1004 inquires the client 1001 about the necessity of importance settings, when the importance is higher than the threshold (i.e., YES in step S2407).

<Job Ticket Storage Position Setting Processing>

Figure 26:
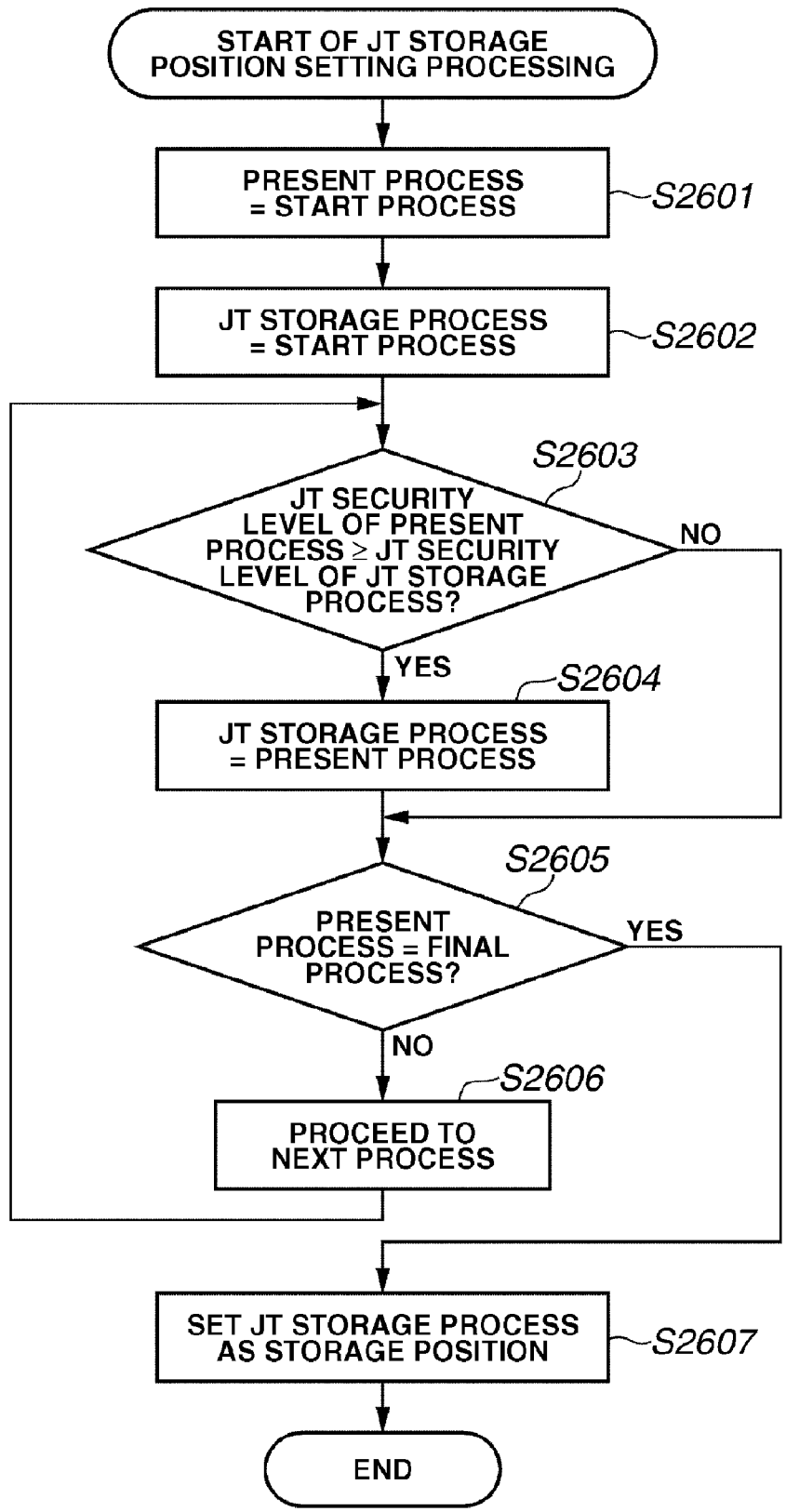
FIG. 26 is a flowchart showing job ticket storage position determination processing.

FIG. 26 is a flowchart showing details of the job ticket storage position determination processing performed in step S1308 of FIG. 13. It is useful to store the job ticket so that the workflow manager 1004 can quickly respond to a reprint request. However, if a storage section has a lower security level, important information may leak out of the storage section.

Accordingly, the flowchart of FIG. 26 provides processing for storing the job ticket in a storage section having a higher security level. The workflow manager 1004 has a pointer indicating a process presently performing the determination processing and a pointer indicating a job ticket storage process.

The workflow manager 1004 sets a present process (i.e., a processing target) in the presently processed workflow as a start process (refer to step S2601), and sets a job ticket storage process as a start process (refer to step S2602).

Then, the workflow manager 1004 compares a job ticket security level of the present process to a security level of the job ticket storage process (refer to step S2603). If the job ticket security level of the present process is higher than the security level of the job ticket storage process (i.e., YES in step S2603), the workflow manager 1004 designates the present process as the job ticket storage process (refer to step S2604).

Then, the workflow manager 1004 determines whether the present process is a final process of the presently processed workflow (refer to step S2605). If the present process is not the final process (i.e., NO in step S2605), the workflow manager 1004 continues the above-described processing of steps S2603 to S2605 for the next process (refer to step S2606).

When the present process is the final process (i.e., YES in step S2605), the workflow manager 1004 can finalize, as a process for storing the job ticket, the process stored as the job ticket storage process (refer to step S2607).

In short, through the processing of FIG. 26, the job ticket can be stored in a process having the highest security level. Thus, leakage of the job ticket can be eliminated when the job ticket is stored for reprint.

FIG. 32 is a flowchart showing delivery time calculation processing performed in step S1205 of FIG. 12.

First, the workflow manager 1004 obtains a total number "n" of workflows presently stored, and designates a target workflow "m" for the delivery time calculation (refer to step S3201).

Subsequently, the workflow manager 1004 initializes "m" (refer to step S3202), and obtains a total number "x" of processes included in the m-th workflow (refer to step S3203). Then, the workflow manager 1004 initializes the present process p (i.e., p=1) to start the delivery time calculation of a first process in the m-th workflow (refer to step S3204).

Then, the workflow manager 1004 obtains a schedule of a device used in the process "p" (refer to step S3205). More specifically, the workflow manager 1004 specifies a device executing the processing in the process "p." Furthermore, the workflow manager 1004 obtains schedule information of the device that executes the process "p" from the MIS server 1003.

The workflow manager 1004 obtains, from the device DB 1006, the device information (e.g., processing speed) of a device used in the process "p" (refer to step S3206).

Then, the workflow manager 1004 specifies a processing termination time of the process "p" based on the schedule information obtained in step S3205 and the device information obtained in step S3206 (refer to step S3207). For example, the workflow manager 1004 calculates a time required to accomplish the processing of the requested contents based on the information relating to processing contents requested by the client and processing speed information of the device used in the process "p."

Then, the workflow manager 1004 specifies the processing termination time by allocating the calculated time to an available position (e.g., vacant time slot) with reference to the schedule information (refer to steps S3208 and S3209). The workflow manager 1004 repeats the processing of steps S3205 through S3207 until calculation for the final process of the m-th workflow is accomplished.

In the second and succeeding processes, the workflow manager 1004 obtains schedule information following the processing termination time specified in step S3207. For example, if the processing termination time of the first process is specified as 10AM of November 3, it is useless to obtain schedule information preceding 10AM of November 3 for the second process because the processing of the second process cannot start before 10AM of November 3.

Through the above-described processing, the workflow manager 1004 specifies and stores the processing termination time of the final process (process x) as a delivery time of the m-th workflow (refer to step S3210). The workflow manager 1004 repeats the above-described processing of steps S3203 to S3212 for all workflows (refer to steps S3211 and S3212). The obtained processing result can be stored in the format shown in FIGS. 19 and 21.

In the first exemplary embodiment, the workflow manager 1004 creates, as many as possible, the workflows that can realize the processing of a received intent node job ticket based on the contents described in the intent node job ticket and process nodes received from respective process servers. Then, the workflow manager 1004 calculates a security level of a print product in each interprocess and a security level of the job ticket, and determines a workflow that can most securely perform the processing. Therefore, the first exemplary embodiment can reduce or eliminate leakage of information during the processing of a workflow.

Furthermore, the workflow manager 1004 determines the securest process for storing a job ticket by checking a state of the storage section of each process. Thus, high confidentiality can be maintained for a reprint operation.

According to the above-described first exemplary embodiment, the workflow manager 1004 gives priority on the security level in determining a workflow for obtaining a final output product. Thus, the first exemplary embodiment can reduce or eliminate leakage of confidential information during the output processing of a product according to a workflow. Furthermore, according to the above-described first exemplary embodiment, a workflow having a higher security level can be selected considering both a print product and a job ticket.

Second Exemplary Embodiment

A second exemplary embodiment of the present invention will be described below.

The processing of the second exemplary embodiment is basically similar to the processing of the first exemplary embodiment. The second exemplary embodiment is different from the first exemplary embodiment in the following features.

<Print Product Security Level Calculation Processing>

FIG. 27 illustrates a security level coefficient calculation table that stores an exemplary print product security level of each process stored in the device database 1901 according to the second exemplary embodiment and can be used to calculate a print product security level of each interprocess.

In the second exemplary embodiment, the security level can be dynamically changed according to the presence of a preceding job to be processed and the state of a device. For example, even if an in-line finisher is used to enhance the confidentiality, an output product may be left for a long time due to failure or malfunction of the device. In this case, confidential information may be leaked. Accordingly, the table shown in FIG. 27 enables the printing system to flexibly change the security level with reference to actual operating conditions.

The security level coefficient calculation table shown in FIG. 27 can be practically used for ST-A1. It is useful to prepare plural kinds of tables for security level coefficient calculation, because the conditions of an output product are dependent on the arrangement of each device. For example, when a device is an in-line finisher, an output product remains in the device if the processing is in a state waiting for completion of a preceding job. However, output sheets may be discharged from a portion other than a discharge port if the device is failed or malfunctioned.

Furthermore, when an output product is physically conveyed, the output product is always left out of the device regardless of failure of the device or waiting of a preceding job. Accordingly, it is useful to set a relatively higher security level in the former case. According to the example shown in FIG. 27, a security level equal to 0.9 is set in the case of "a preceding job." However, it is useful to set a lower security level in the latter case. Thus, in FIG. 27, a security level equal to 0.5 is set in the case of "malfunctioned."

FIG. 28 shows an example including plural kinds of security level coefficient calculation tables prepared for plural processes.

<Job Ticket Security Level Calculation Processing>

FIG. 29 is a flowchart showing job ticket security level calculation processing according to the second exemplary embodiment. According to the second exemplary embodiment, the security level can be dynamically changed based on the function of each process.

The workflow manager 1004 initializes a job ticket security level (refer to step S2901), and sets, as the decision process, a start process of the present target workflow (refer to step S2902).

Then, the workflow manager 1004 determines whether an output section of the decision process is covered by hypertext transfer protocol security (HTTPS) (refer to step S2903). The workflow manager 1004 can perform the processing of step S2903 based on the information obtained from process servers managing the devices.

When the decision process is covered by HTTPS (i.e., YES in step S2903), the workflow manager 1004 adds a predetermined value to the security level of the interprocess transferring from the present target decision process to the next process (refer to step S2904). More specifically, the workflow manager 1004 increases the security level of the interprocess. On the other hand, if the decision process is not covered by HTTPS (i.e., NO in step S2903), the workflow manager 1004 subtracts a predetermined value from the security level of the interprocess transferring from the decision process to the next process (refer to step S2905).

More specifically, the workflow manager 1004 decreases the security level of the interprocess. The changed security level of each interprocess can be stored in the format shown in FIG. 20. In this manner, the workflow manager 1004 can increase or decrease the security level based on the decision result.

Subsequently, the workflow manager 1004 determines whether there is an interprocess authentication function (refer to step S2906). For example, a password may be assigned beforehand so that the processing in the interprocess can be permitted only when an entered password is authenticated. When the interprocess authentication function is present (i.e., YES in step S2906), the workflow manager 1004 adds a predetermined value to the security level of the interprocess transferring from the decision process to the next process (refer to step S2907). On the other hand, if the authentication function is not present (i.e., NO instep S2906), the workflow manager 1004 subtracts a predetermined value from the security level of the interprocess transferring from the decision process to the next process (refer to step S2908).

Then, the workflow manager 1004 determines whether the decision process and the next process execute the processing with reference to the job ticket of the same DB (refer to step S2909). When the decision process and the next process refer to the job ticket of the same DB (i.e., YES in step S2909), the workflow manager 1004 adds a predetermined value to the job ticket security level (refer to step S2910). If the decision process and the next process do not refer to the job ticket of the same DB (i.e., NO in step S2909), the workflow manager 1004 subtracts a predetermined value from the security level (refer to step S2911).

More specifically, the probability of information leakage can be decreased when only one database manages the job tickets and can be increased when two or more databases manage the job tickets. Therefore, the workflow manager 1004 can obtain an appropriate security level through the decision processing of step S2909.

The workflow manager 1004 repeats the above-described processing until the decision process becomes a final process (refer to steps S2912 and S2913).

Although the processing of FIG. 29 adds or subtracts a predetermined value to or from the security level, it is useful to dynamically change the value to be added or subtracted. For example, even if the job tickets are stored in the same database, the addition value can be decreased according to deterioration of security function of the DB. Furthermore, even if the job tickets are stored in different databases, the subtraction value can be decreased according to an improvement of a security function of the databases.

As described above, according to the processing of FIG. 29, the workflow manager 1004 can calculate a proper security level not only based on the processing type (e.g., in-line, near-line, or off-line) but also based on other functions. Therefore, the workflow manager 1004 can select a workflow having a higher security level to handle a job ticket.

<Job Importance Calculation Processing Flow>

Figure 30:
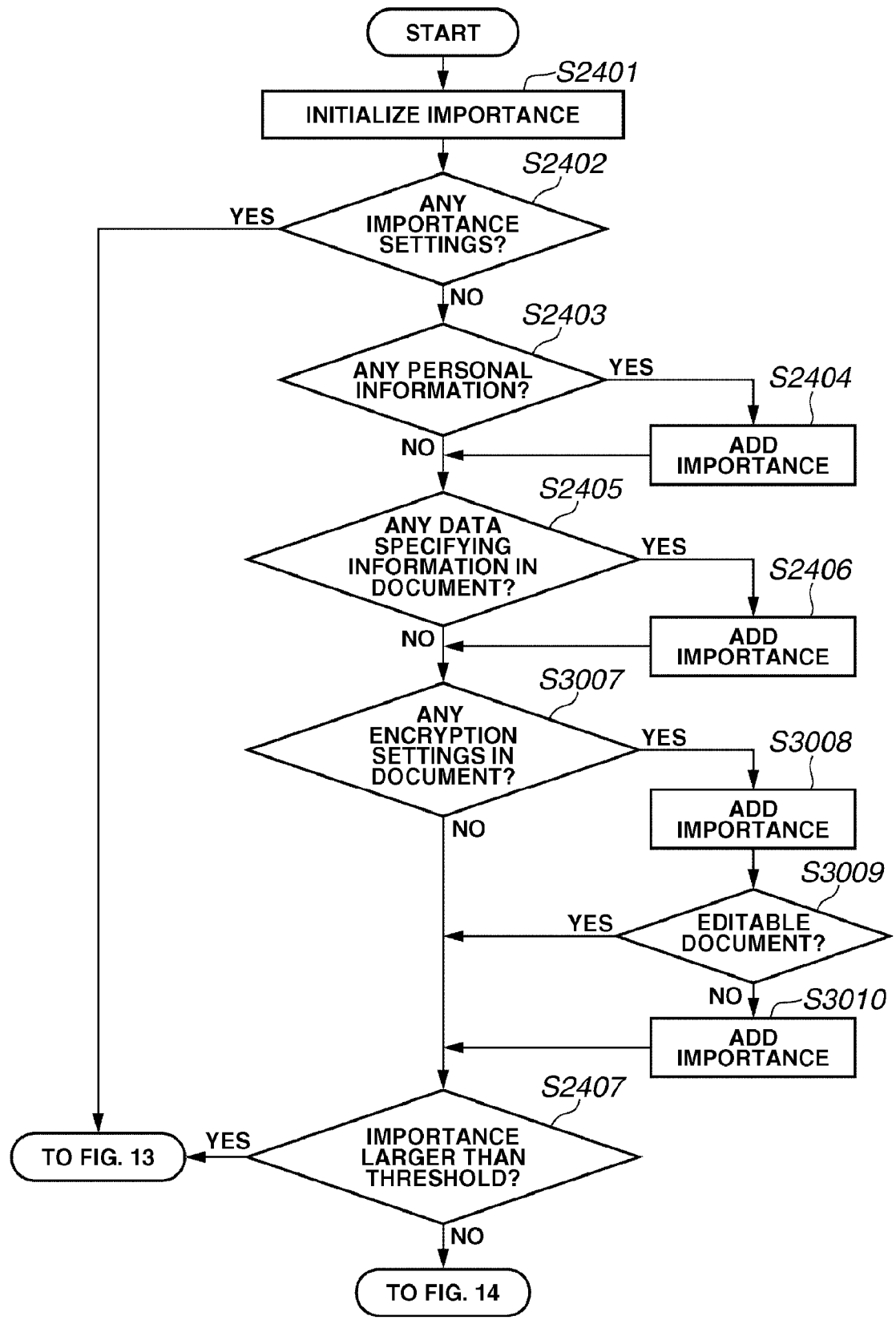
FIG. 30 is a flowchart showing exemplary importance addition processing.

FIG. 30 is a flowchart including steps S3007 through step S3010 in addition to the steps shown in the flowchart of FIG. 24.

More specifically, the workflow manager 1004 determines whether the document includes encryption settings (refer to step S3007). When the document includes encryption settings (i.e., YES in step S3007), the workflow manager 1004 adds a predetermined value to the importance (refer to step S3008).

Furthermore, the workflow manager 1004 determines whether the document is editable (refer to step S3009). When the document is editable (i.e., YES in step S3009), the workflow manager 1004 adds a predetermined value to the importance (refer to step S3010). The rest of processing shown in FIG. 30 is similar to the processing described with reference to FIG. 24 and will not be described below in detail.

Although the present exemplary embodiment describes a method for automatically selecting a workflow that can securely handle a print product (refer to step S1302 of FIG. 13), it is useful to display the processing result of FIG. 12 as shown in FIG. 33 to let the client select a desired workflow. For example, a UI shown in FIG. 33 can be displayed and a user can select a desirable workflow giving priority on the delivery time, or select another workflow considering both the delivery time and the security level.

The workflow manager 1004 can create workflows based on the process node job ticket in the following manner. For example, the workflow manager 1004 can transmit the intent node job ticket of FIG. 9 to each process server and can receive a process node job ticket shown in FIG. 31. The process node job ticket can be divided into plural portions for respective processing processes. Furthermore, the workflow manager 1004 can create a workflow for executing the contents described in the intent node job ticket by combining process node job tickets received from respective devices.

For example, when creation of five copies of an A4-size book (10 pages) is requested, the workflow manager 1004 creates one workflow as a combination of process node job tickets 3101, 3103, 3106, and 3109. Furthermore, the workflow manager 1004 retrieves other combinations and creates another workflow as a combination of process node job ticket 3102, 3104, 3107, 3110, and 3108. By repeating the above-described processing, the workflow manager 1004 can create plural kinds of workflows that can execute the contents described in the intent node job ticket. Then, the workflow manager 1004 can select an optimum workflow from the created plural workflows with reference to the calculated security level.

The present invention can be applied to a system including a plurality of devices (e.g., a host computer, an interface device, a reader, a printer, etc.), or can be applied to a single device (e.g., a copying machine, a facsimile apparatus, etc.).

Furthermore, software program code for realizing the functions of the above-described exemplary embodiments can be supplied, via a storage medium (or a recording medium), to a system or an apparatus. A computer (or CPU or MPU) in the system or the apparatus can read the program code stored in the storage medium and can execute the readout program.

In this case, the program code read out from the storage medium can realize the functions of the exemplary embodiments. The equivalents of programs can be used if they possess comparable functions. Accordingly, when the functions or processes of the exemplary embodiments are realized by a computer, program code installed in the computer and a recording medium storing the program are used to implement the present invention.

In this case, the type of program can be any one of object code, interpreter program, and OS script data.

A storage medium supplying the program can be selected from any one of a flexible disk, a hard disk, an optical disk, a magneto-optical disk, an MO, a CD-ROM, a CD-R, a CD-RW, a magnetic tape, a nonvolatile memory card, a ROM, and a DVD (DVD-ROM, DVD-R).

In other words, the present invention encompasses a computer program that can realize the functions or processes of the exemplary embodiments or any recording medium that can store the program.

The method for supplying the program includes accessing a home page on the Internet using the browsing function of a client computer, when the home page allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different home pages. Namely, the present invention encompasses WWW servers or FTP servers that allow numerous users to download the program files so that the functions or processes of the present invention can be realized on their computers.

Furthermore, enciphering the programs of the present invention and storing the enciphered programs in a CD-ROM or comparable recording medium is an exemplary method when the programs of the present invention are distributed to the users. The authorized users (i.e., users satisfying a predetermined condition) are allowed to download key information from a home page on the Internet. The users can decipher the programs with the obtained key information and can install the programs on their computers. When the computer reads and executes the installed programs, the functions of the above-described exemplary embodiments can be realized.

Furthermore, not only the functions of the above-described exemplary embodiment can be realized by a computer that executes the programs, but also an operating system (OS) running on the computer can execute part or all of the actual processing based on instructions of the programs.

Furthermore, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

The present invention can be realized by supplying the program(s) to a system or an apparatus. In this case, the system or the apparatus can read the software program relating to the present invention from a storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-359075 filed Dec. 13, 2005, which is hereby incorporated by reference herein in its entirety.

What is claimed is:

1. An information processing apparatus configured to generate a processing route defining a processing order of plural processing processes to process output information including output setting information and print data, the information processing apparatus comprising:
   a selection unit configured to select devices that can process the print data according to the output setting information;
   a generation unit configured to generate at least one processing route for processing the print data by combining the devices selected by the selection unit for executing the plural processing processes;
   a first determination unit configured to determine a security level of each generated processing route based on a defined condition;
   a second determination unit configured to determine a processing route for processing the print data based on the security level determined by the first determination unit; and
   a first calculation unit configured to calculate the security level as index showing that an interprocess for transferring an output result of a device executing the processing of a target processing process to a device executing a next processing process via a physically connected conveyance path is secure compared to another interprocess for transferring an output result of a device executing the processing of a target processing process to a device executing a next processing process via a physically disconnected conveyance path, wherein the first determination unit compares security levels of plural interprocesses in a target processing route calculated by the first calculation unit and determines, as a security level of the target processing route, a security level of the interprocess that cannot be securely processed compared to other interprocesses.

2. A method for an information processing apparatus configured to generate a processing route defining a processing order of plural processing processes to process output information including output setting information and print data, the method comprising:
   selecting devices that can process the print data according to the output setting information;
   generating at least one processing route for processing the print data by combining the selected devices for executing the plural processing processes;

determining a security level of each generated processing route according to a predetermined condition;

determining a processing route for processing the print data based on the security level determined for each processing route;

calculating the security level as index showing that an interprocess for transferring an output result of a device executing the processing of a target processing process to a device executing a next processing process via a physically connected conveyance path is secure compared to another interprocess for transferring an output result of a device executing the processing of a target processing process to a device executing a next processing process via a physically disconnected conveyance path;

comparing security levels of plural interprocesses in a target processing route; and determining, as a security level of the target processing route, a security level of the interprocess that cannot be securely processed compared to other interprocesses.

3. A non-transitory computer-readable recording medium storing a program that causes an information processing apparatus to perform a method according to claim 2.

* * * * *